US010759531B2

(12) United States Patent
Yamada et al.

(10) Patent No.: US 10,759,531 B2
(45) Date of Patent: Sep. 1, 2020

(54) FLYING MACHINE AND FLYING MACHINE USAGE METHOD

(71) Applicant: FUJITSU LIMITED, Kawasaki-shi, Kanagawa (JP)

(72) Inventors: Moyuru Yamada, Machida (JP); Yoshiro Hada, Atsugi (JP); Manabu Nakao, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 558 days.

(21) Appl. No.: 15/442,796

(22) Filed: Feb. 27, 2017

(65) Prior Publication Data
US 2017/0274995 A1    Sep. 28, 2017

(30) Foreign Application Priority Data

Mar. 22, 2016 (JP) ................................ 2016-057335

(51) Int. Cl.
*B64C 39/00* (2006.01)
*B64C 23/00* (2006.01)
(Continued)

(52) U.S. Cl.
CPC .......... *B64C 39/003* (2013.01); *B64C 23/005* (2013.01); *B64C 37/00* (2013.01);
(Continued)

(58) Field of Classification Search
CPC ..... B64C 39/003; B64C 23/005; B64C 37/00; B64C 39/024; B64C 2201/027; B64C 2201/127; B64C 2201/18; B64C 25/34; B64C 25/54; B64C 2201/108; B64C 2201/123; B64C 2201/148; B64C 39/022; B64C 2201/06; B64C 2201/042; B64F 3/02

See application file for complete search history.

(56) References Cited

U.S. PATENT DOCUMENTS 4,505,346 A * 3/1985 Mueller ................. B62D 57/04
                                                         180/21
8,794,564 B2 * 8/2014 Hutson .................. B64D 45/00
                                                        244/17.17
(Continued)

FOREIGN PATENT DOCUMENTS

JP          3-67295         7/1991
JP        2015-117003       6/2015
(Continued)

OTHER PUBLICATIONS

Espacenet English abstract for International Patent Publication No. WO 2014/196461, published Dec. 11, 2014.
(Continued)

*Primary Examiner* — Valentina Xavier
(74) *Attorney, Agent, or Firm* — Staas & Halsey LLP

(57) ABSTRACT

A flying machine includes: a flying machine body that includes a rotor blade; a protective member that forms a frame shape inside which the rotor blade is disposed, that is rotatably fixed to both end portions of the flying machine body, and that is pipe shaped; and a connecting wire that passes through an inner portion of the protective member to connect the flying machine body and an external device together.

19 Claims, 23 Drawing Sheets

(51) Int. Cl.
*B64C 37/00* (2006.01)
*B64C 39/02* (2006.01)

(52) U.S. Cl.
CPC ...... *B64C 39/024* (2013.01); *B64C 2201/027* (2013.01); *B64C 2201/127* (2013.01); *B64C 2201/18* (2013.01)

(56) References Cited

U.S. PATENT DOCUMENTS

| | | | | |
|---|---|---|---|---|
| 8,874,283 | B1* | 10/2014 | Cavote | B64D 47/08 701/11 |
| 9,061,558 | B2* | 6/2015 | Kalantari | A63H 27/12 |
| D761,920 | S * | 7/2016 | Fargeau | D12/16.1 |
| 9,902,493 | B2* | 2/2018 | Simon | B64C 29/0025 |
| 10,099,778 | B2* | 10/2018 | Sugaki | B64C 25/34 |
| 10,384,772 | B2* | 8/2019 | Yamada | B64C 25/54 |
| 2014/0131507 | A1 | 5/2014 | Kalantari et al. | |
| 2014/0319266 | A1* | 10/2014 | Moschetta | B64C 25/36 244/13 |
| 2015/0041598 | A1* | 2/2015 | Nugent | B64B 1/50 244/53 R |
| 2015/0274294 | A1 | 10/2015 | Dahlstrom | |
| 2016/0009381 | A1 | 1/2016 | Benatar et al. | |
| 2018/0057135 | A1* | 3/2018 | Yan | A63H 30/04 |

FOREIGN PATENT DOCUMENTS

| | | |
|---|---|---|
| JP | 2015-189321 | 11/2015 |
| JP | 2016-16863 | 2/2016 |
| JP | 2016-26946 | 2/2016 |
| WO | WO 2014/196461 A1 | 12/2014 |

OTHER PUBLICATIONS

Espacenet English abstract for Japanese Patent Publication No. 2016-26946, published Feb. 18, 2016.
Espacenet English abstract for Japanese Patent Publication No. 2016-16863, published Feb. 1, 2016.
Espacenet English abstract for Japanese Patent Publication No. 2015-189321, published Nov. 2, 2015.
Japanese Patent Office Action dated Sep. 24, 2019 in corresponding Japanese Patent Application No. 2016-057335.
English Abstract of Japanese Publication No. 2015-117003 published Jun. 25, 2015.

* cited by examiner

FLYING MACHINE AND FLYING MACHINE USAGE METHOD

CROSS-REFERENCE TO RELATED APPLICATION

This application is based upon and claims the benefit of priority of the prior Japanese Patent Application No. 2016-057335, filed on Mar. 22, 2016, the entire contents of which are incorporated herein by reference.

FIELD

Technology disclosed in the present application is related to a flying machine including a rotor blade, and a flying machine usage method.

BACKGROUND

The flying machine described in the patent document below is an example of a flying machine including a rotor blade. Namely, an example of a flying body is described in the patent document below. The flying body includes a flying body main body including a body section and plural propulsion sections, and a pair of protective frames. A control section and a battery are mounted to the body section of the flying body main body, and the propulsion sections each include a propeller and a motor.

RELATED PATENT DOCUMENTS

Japanese Patent Application Laid-Open (JP-A) No. 2015-117003

SUMMARY

According to an aspect of the embodiments, a flying machine includes: a flying machine body that includes a rotor blade; a protective member that forms a frame shape inside which the rotor blade is disposed, that is rotatably fixed to both end portions of the flying machine body, and that is pipe shaped; and a connecting wire that passes through an inner portion of the protective member to connect the flying machine body and an external device together.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
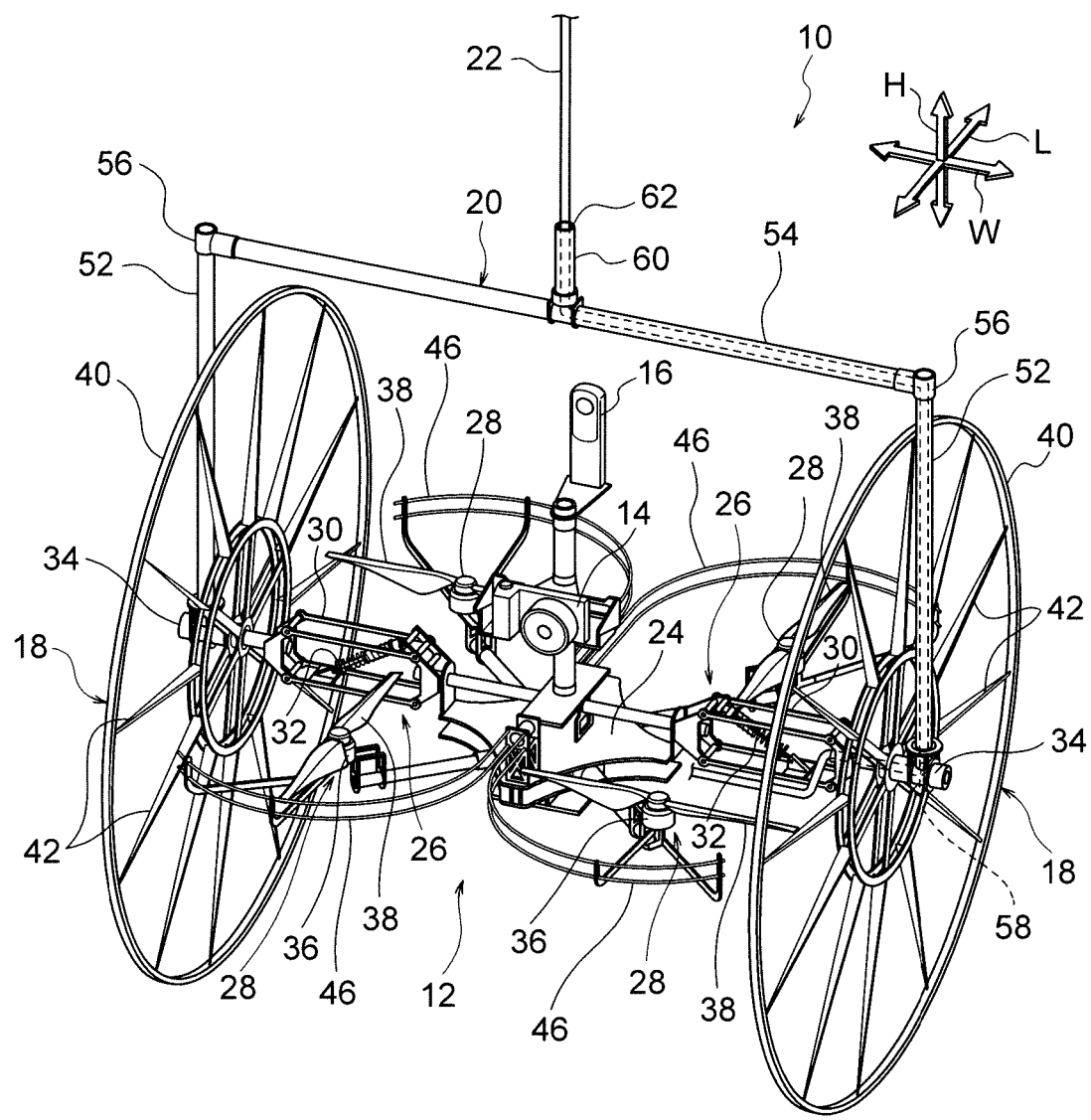
FIG. 1 is a perspective view of a flying machine.

Explanation follows regarding an exemplary embodiment of technology disclosed in the present application.

As illustrated in FIG. 1 to FIG. 5, a flying machine 10 according to the present exemplary embodiment includes a flying machine body 12, a pair of wheels 18, a protective member 20, and a connecting wire 22. In each of the drawings, the arrow W, the arrow L, and the arrow H respectively indicate the width direction, the front-rear direction, and the height direction of the flying machine 10.

The flying machine body 12 includes a body section 24, a pair of suspension mechanisms 26, and plural propulsion sections 28. The body section 24 is disposed at a central portion of the flying machine body 12 in the width direction and the front-rear direction.

The pair of suspension mechanisms 26 are respectively disposed on both width direction sides of the body section 24. The pair of suspension mechanisms 26 have left-right symmetry to each other. Each suspension mechanism 26 includes parallel links 30 and a shock absorber 32. One end of each set of parallel links 30 is fixed to the body section 24, and a wheel shaft 34 is provided at another end of each set of parallel links 30.

Each shock absorber 32 is provided between a pair of upper links and a pair of lower links of each set of parallel links 30. The shock absorber 32 is surrounded by the parallel links 30. The shock absorbers 32 are disposed coaxially to the wheel shafts 34 in a plan view of the flying machine 10.

As an example, the same components are employed for each of the plural propulsion sections 28. Four propulsion sections 28 are employed in the present exemplary embodiment as an example. The four propulsion sections 28 are uniformly disposed in a total of four locations, these being on both width direction sides and both front-rear direction sides of the body section 24, and are fixed to the body section 24.

There are four propulsion sections 28 in the present exemplary embodiment as an example; however, the number of propulsion sections 28 may be set as desired. Each propulsion section 28 includes a motor 36 and a rotor blade 38. The rotor blade 38 is fixed to an output shaft of the motor 36. The motor 36 and the rotor blade 38 are disposed with their axial direction along the height direction of the flying machine body 12.

The flying machine 10 ascends when the plural rotor blades 38 rotate. The number of revolutions of each of the plural motors 36, namely, the number of revolutions of each of the plural rotor blades 38, is controlled individually. In the flying machine 10, the flying machine 10 can be made to fly in a desired direction by causing the number of revolutions of each of the plural rotor blades 38 to differ.

The flying machine body 12 also includes a camera 14 and a sensor 16. The camera 14 and the sensor 16 are disposed above the body section 24 and are fixed to the body section 24. The camera 14 is disposed facing toward the front of the flying machine body 12 and images a target object. A desired sensor that is capable of acquiring various data from the target object is employed as the sensor 16.

Note that configuration may be such that only one from out of the camera 14 or the sensor 16 is mounted to the body section 24. The number of cameras 14 and sensors 16 may be selected as desired and plural of each may be employed. An electronic device other than the camera 14 and the sensor 16 may also be mounted to the body section 24.

The pair of wheels 18 are respectively rotatably fixed to the pair of wheel shafts 34. The pair of wheel shafts 34 are respectively provided at both width direction end portions of the flying machine body 12, and extend in a direction orthogonal to the axial direction of the rotor blades 38, namely, in the width direction of the flying machine body 12 in the present exemplary embodiment. The pair of wheels 18 are respectively supported by the pair of wheel shafts 34 so as to be capable of rotating about the width direction of the flying machine body 12.

The pair of wheels 18 are supported by the body section 24 through the pair of suspension mechanisms 26. The pair of wheels 18 are capable of being displaced in the height direction of the flying machine body 12 accompanying operation of the pair of suspension mechanisms 26.

As an example, identical wheels are employed as the pair of wheels 18. Each wheel 18 includes a circular ring shaped outer peripheral portion 40 and plural spokes 42. The plural spokes 42 extend in radiating shapes about a central portion of the wheel 18, and support the outer peripheral portion 40 from the inside of the outer peripheral portion 40.

Figure 6:
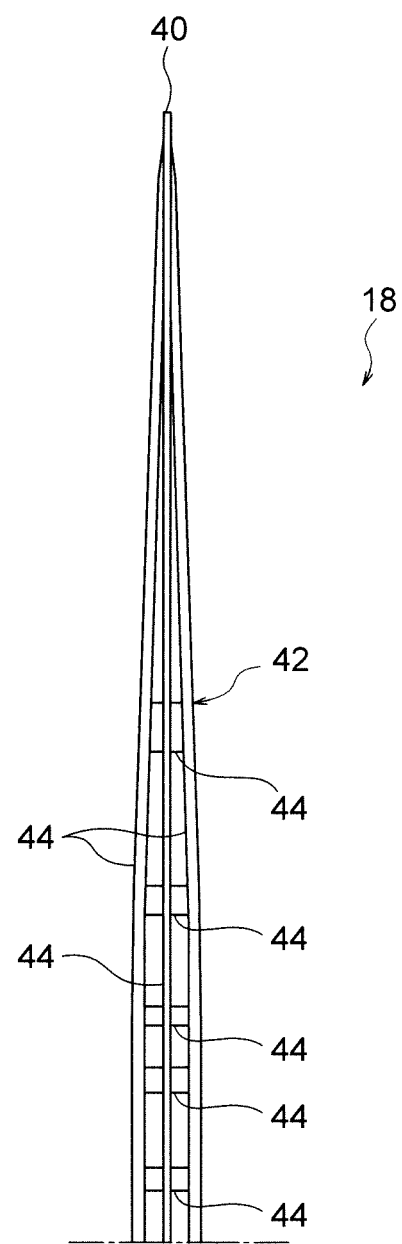
FIG. 6 is a drawing of a spoke of a wheel as viewed along the circumferential direction of the wheel.

The opening area in the axial direction of each wheel 18 is preferably large in order to reduce air resistance in the width direction of the flying machine 10, and the plural spokes 42 each form thin plate shapes with their plate thickness direction in the circumferential direction of the wheel 18. As illustrated in FIG. 6, each spoke 42 has a framework structure employing plural plate members 44 with their plate thickness direction along the circumferential direction of the wheel 18.

As illustrated in FIG. 1 to FIG. 5, the pair of wheels 18 are disposed further to the width direction outsides of the flying machine body 12 than the above-described plural rotor blades 38. Plural guard sections 46 that surround the respective rotor blades 38 are also provided to the body section 24.

Figure 4:
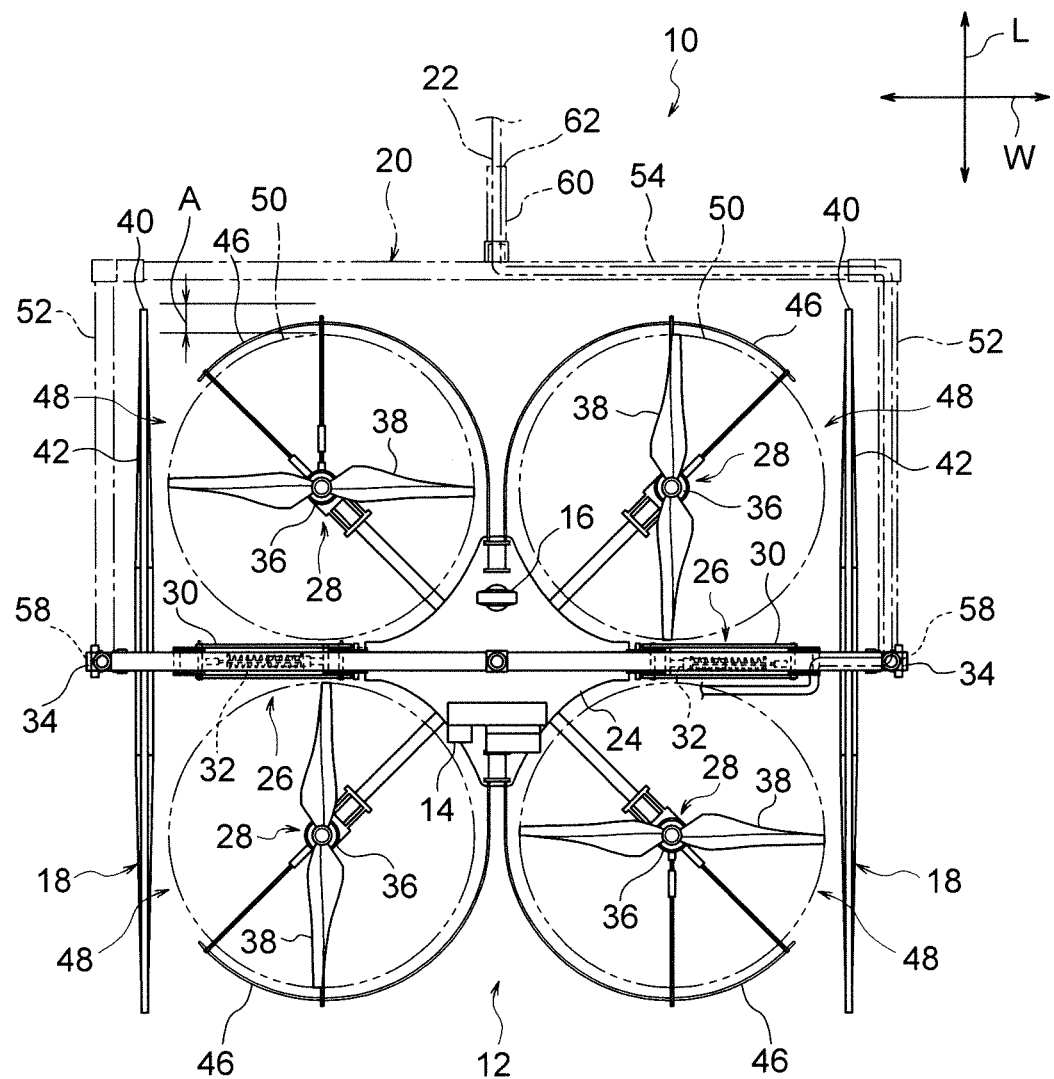
FIG. 4 is a plan view of a flying machine.

As illustrated in FIG. 4, each guard section 46 is provided to part of a surrounding portion of the respective rotor blade 38, this being a part excluding a location 48 facing the respective wheel 18. In the present exemplary embodiment as an example, each guard section 46 is formed in a circular arc shape, with one end of each guard section 46 fixed to the body section 24 and another end of each guard section 46 positioned near to the outer peripheral portion 40 of the respective wheel 18.

Figure 3:
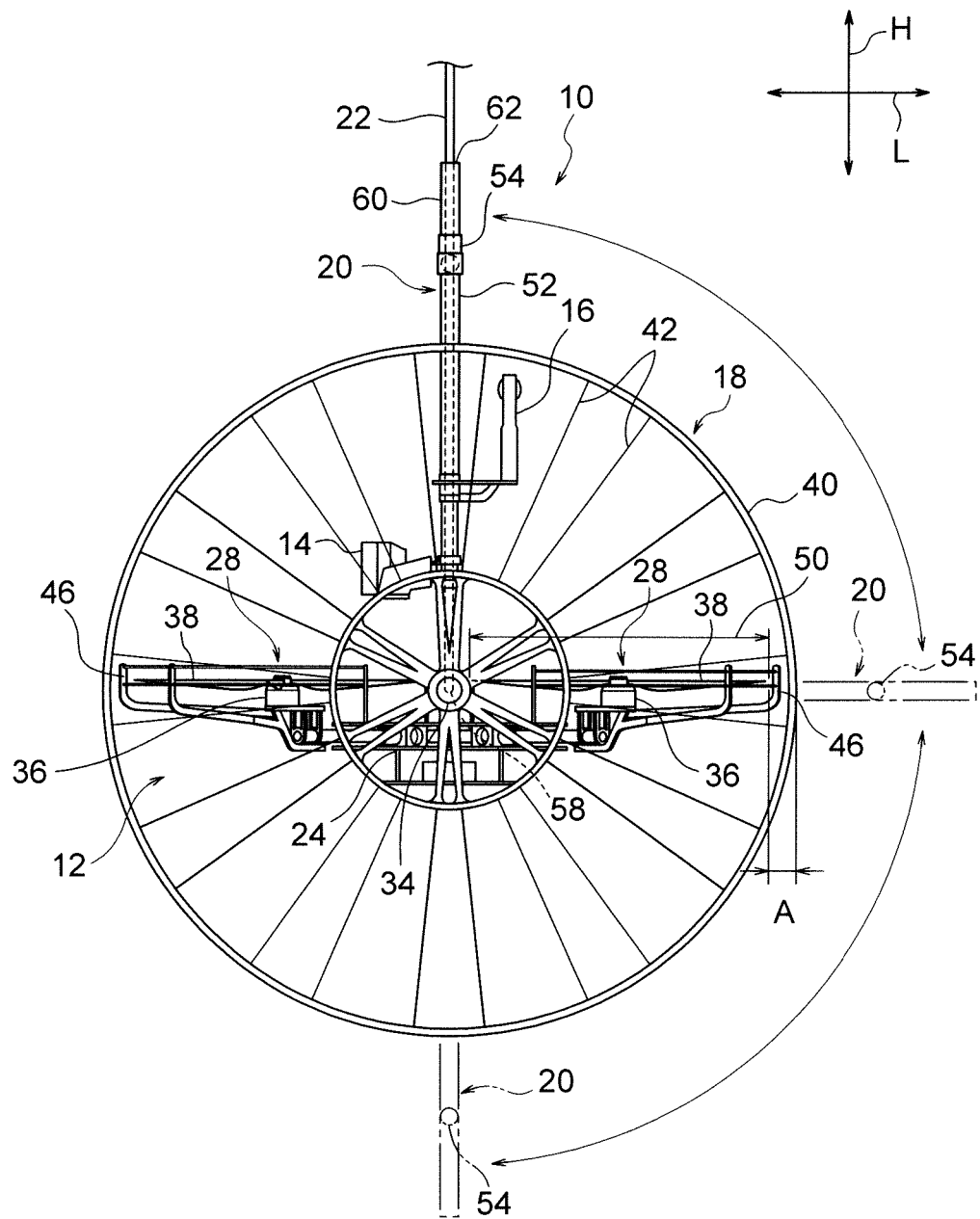
FIG. 3 is side view of a flying machine.

The outer peripheral portions 40 of the pair of wheels 18 jut out further toward the outside, namely, toward both front-rear direction sides of the body section 24, than rotation swept paths 50 of the rotor blades 38 in an axial direction view of the rotor blades 38. In FIG. 3 and FIG. 4, a jutting-out amount of each outer peripheral portion 40 with respect to the rotation swept paths 50 of the rotor blades 38 is indicated by the dimension A.

Figure 2:
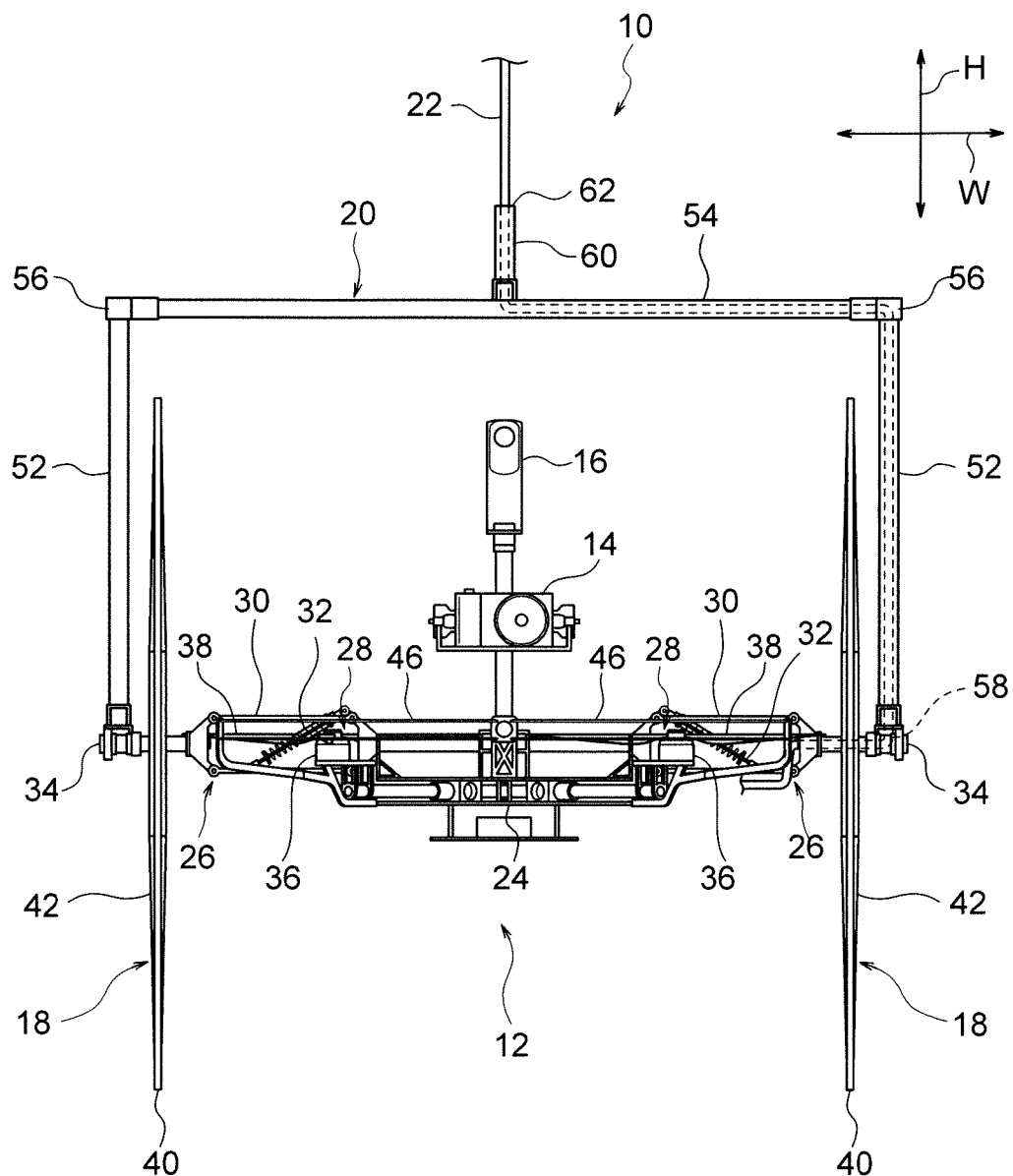
FIG. 2 is a face-on view of a flying machine.

As illustrated in FIG. 1 and FIG. 2, the protective member 20 forms a frame shape including a pair of first pipes 52 and a second pipe 54. The pair of first pipes 52 extend in a direction orthogonal to the pair of wheel shafts 34, and the second pipe 54 extends along the width direction of the flying machine body 12. One ends of the pair of first pipes 52 are respectively rotatably fixed to the pair of wheel shafts 34, and the second pipe 54 is respectively coupled to other ends of the pair of first pipes 52.

The pair of first pipes 52 are positioned at the axial direction outsides of the pair of wheels 18, namely, further toward the width direction outsides of the flying machine body 12 than the pair of wheels 18 in the present exemplary embodiment. The axial direction length of the pair of first pipes 52 is longer than the radius of each wheel 18. The second pipe 54 is positioned at the radial direction outside of the pair of wheels 18. By disposing the pair of first pipes 52 at the axial direction outsides of the pair of wheels 18, the plural rotor blades 38 positioned at the axial direction insides of the pair of wheels 18 are disposed inside the frame shaped protective member 20.

As illustrated in FIG. 3 and FIG. 4, the outer peripheral portions 40 of the pair of wheels 18 jut out further toward the outside than the rotation swept paths 50 of the rotor blades 38 in an axial direction view of the rotor blades 38 as previously described, and the axial direction length of the pair of first pipes 52 is longer than the radius of each wheel 18. Configuration is thereby such that the second pipe 54 passes at the outside of the rotation swept paths 50 of the rotor blade 38 when the frame shaped protective member 20 rotates about the width direction of the flying machine body 12.

In FIG. 3 and FIG. 4, the manner in which the second pipe 54 passes further toward the rear side than the rotation swept paths 50 of the rotor blades 38 provided at the rear side of the flying machine 10 is indicated by imaginary lines as an example. Note that, although a relationship between the rotation swept paths of the rotor blades 38 provided at the front side of the flying machine 10 and the second pipe 54 is not illustrated in FIG. 3 or FIG. 4, the second pipe 54 also passes further toward the front side than the rotation swept paths of the rotor blades 38 provided at the front side of the flying machine 10.

Figure 7:
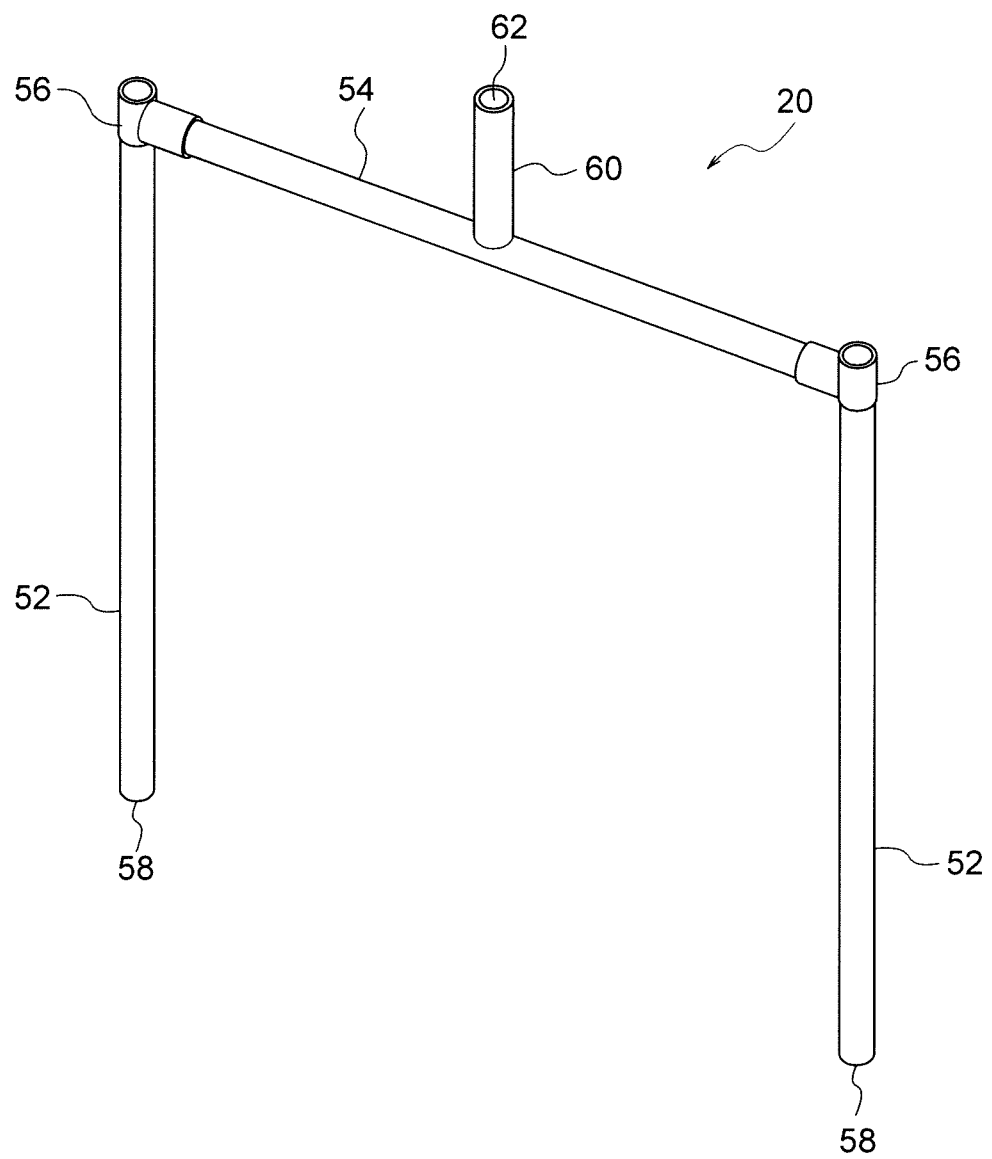
FIG. 7 is a perspective view of a protective member.

The protective member 20 is preferably capable of being divided into plural members. Namely, as illustrated in FIG. 7, the protective member 20 includes the pair of first pipes 52, the second pipe 54, and a pair of joints 56 as an example of plural dividable members in the present exemplary embodiment. The pair of first pipes 52 and the second pipe 54 are separate bodies to each other, and the pair of first pipes 52 and the second pipe 54 are fixed together through the pair of joints 56. The protective member 20 is flexible so as to allow operation of the pair of suspension mechanisms 26 illustrated in FIG. 1.

The connecting wire 22 includes a power line and a signal line, for example. One end of the connecting wire 22 is connected to, for example, the motors 36, the camera 14, and the sensor 16 of the flying machine body 12. Note that a control circuit for controlling the motors 36, the camera 14, the sensor 16, and so on, and an emergency battery or the like for supplying power to the motors 36, the camera 14, the sensor 16, and so on, are sometimes mounted to the body section 24. In such cases, the one end of the connecting wire 22 may be connected to the control circuit, the emergency battery, or the like.

Another end of the connecting wire 22 is connected to an external device, described later. The external device includes, for example, a power supply unit, a control section, and a data collection section.

The connecting wire 22 passes through an inner portion of the pipe shaped protective member 20 so as to connect the flying machine body 12 and the external device together. Specifically, openings 58 are respectively formed in the one ends of the pair of first pipes 52. A pipe shaped guide portion 60 that extends in the same direction as the axial direction of the pair of first pipes 52 is provided at a length direction central portion of the second pipe 54, and an opening 62 is formed in a leading end of the guide portion 60. An inner portion of the pair of first pipes 52, an inner portion of the second pipe 54, and an inner portion of the guide portion 60 are in communication with each other.

The connecting wire 22 passes through an inner portion of the protective member 20 between the opening 58, positioned at the one end of either first pipe 52 from out of the pair of first pipes 52, and the opening 62 of the guide portion 60 positioned at the length direction central portion of the second pipe 54. Note that the guide portion 60 may be omitted.

Figure 5:
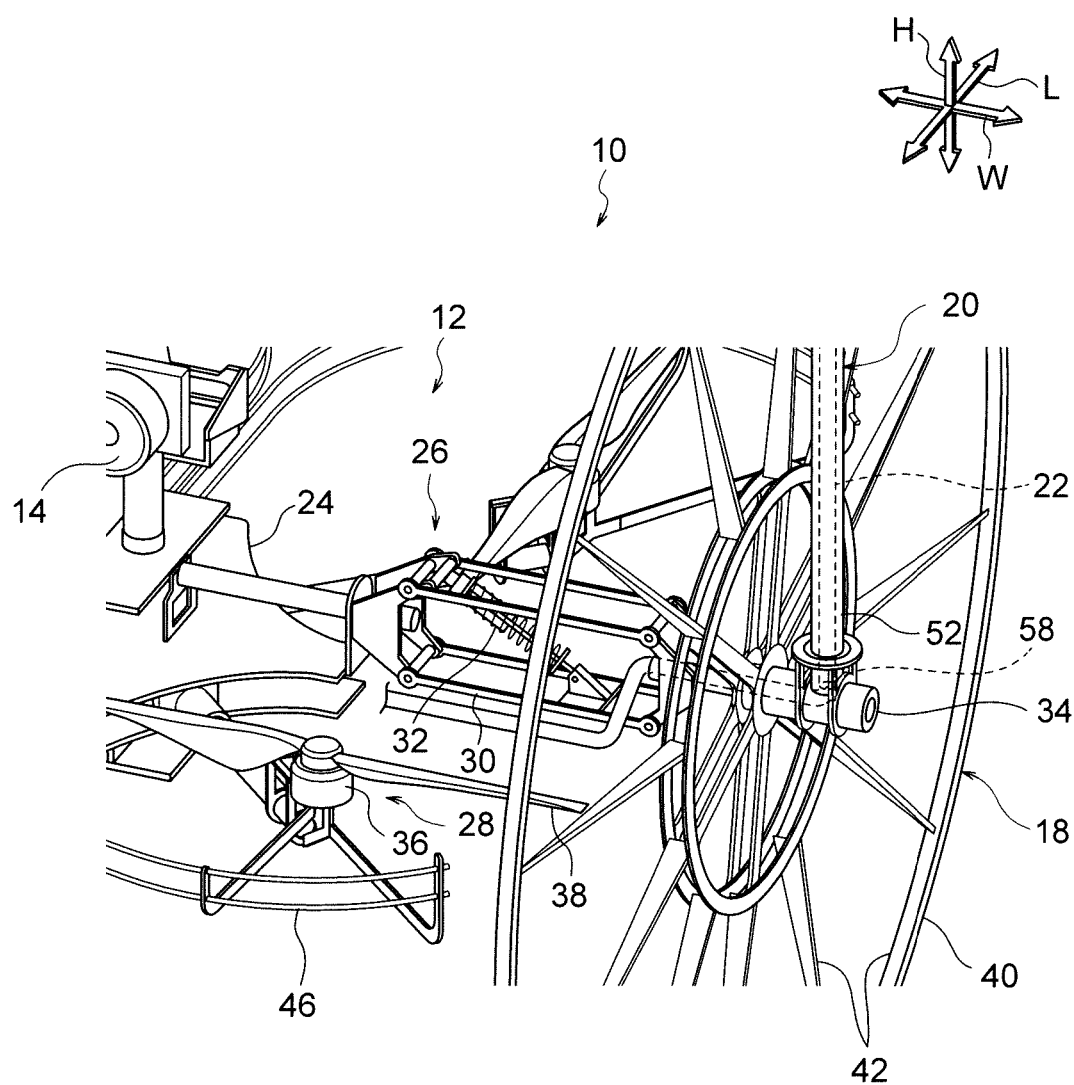
FIG. 5 is an enlarged perspective view of relevant portions of a flying machine.

As illustrated in FIG. 5, after having been lead out from the opening 58 positioned at the one end of the respective first pipe 52, the connecting wire 22 passes through an inner portion of the pipe shaped wheel shaft 34 that is rotatably supported by the first pipe 52, and is routed toward the body section 24 side. The connecting wire 22 routed toward the body section 24 side is then, for example, routed along a link from out of the parallel links 30 and is fixed to this link by a fastening band or the like.

Explanation follows regarding a usage method of the above-described flying machine 10.

Figure 8:
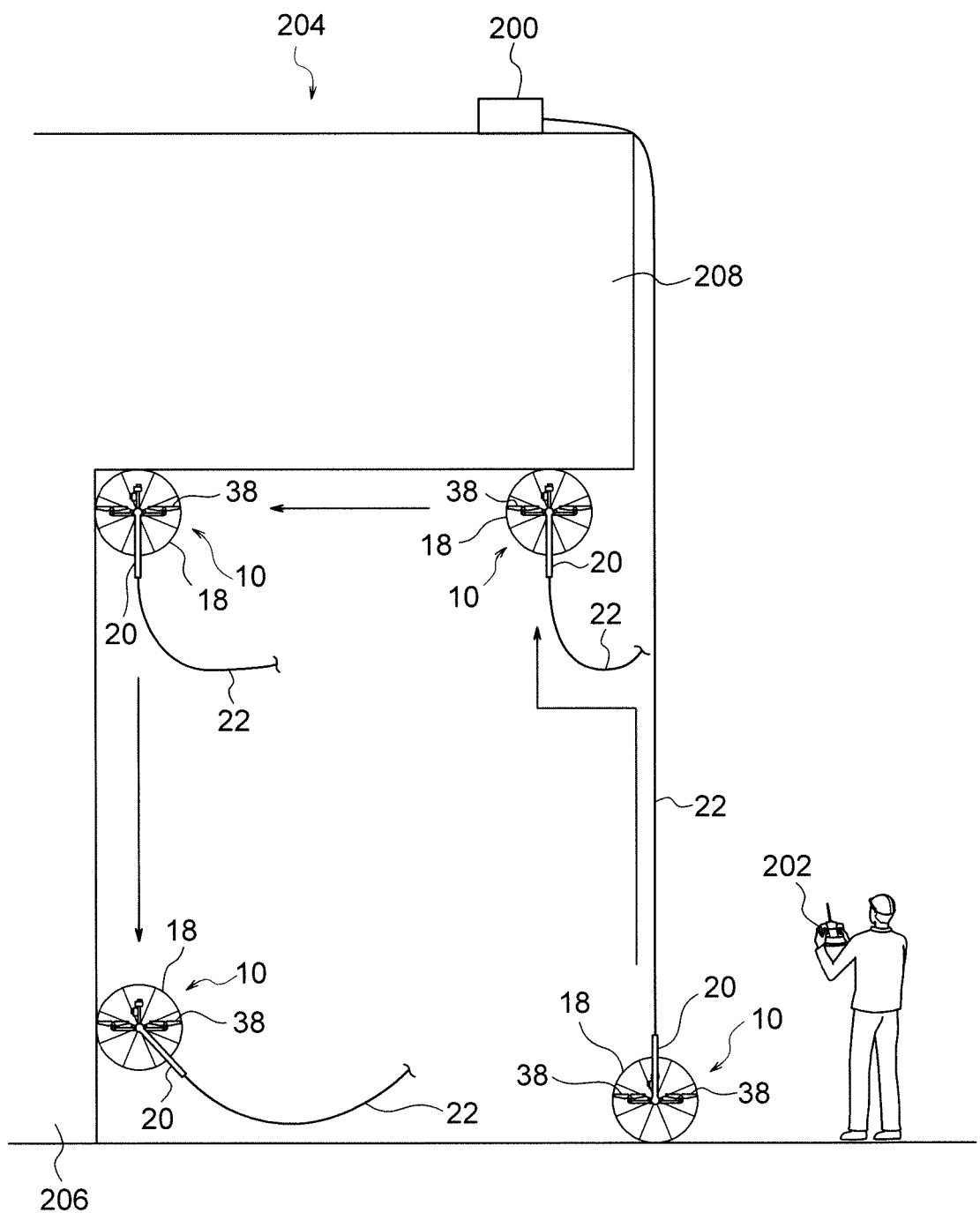
FIG. 8 is a drawing illustrating a first example of a usage method of a flying machine.

FIG. 8 illustrates a first example of a usage method of the flying machine 10. The flying machine 10 flies based on signals emitted from a controller 202 operated by an operator. The signals emitted from the controller 202 may be wirelessly transmitted to the flying machine 10, or may be transmitted to the flying machine 10 by wire using the above-described connecting wire 22.

In this first example, imaging, observing, recording, examining, inspecting, and so on of a target object are performed by the flying machine 10 while flying. Imaging, observing, recording, examining, inspecting, and so on of a target object are performed using the camera 14 and the sensor 16. In this first example, the target object is a bridge 204, for example. The bridge 204 includes a bridge pile 206 and a bridge girder 208. In this first example, an external device 200 is placed on top of the bridge girder 208, and the flying machine 10 is disposed on the ground directly below a side face of the bridge girder 208. In a state in which the external device 200 has been placed on top of the bridge girder 208 and the flying machine 10 has been disposed on the ground, the connecting wire 22 is in a suspended state.

In this first example, when the flying machine 10 ascends and the flying machine 10 reaches a lower face of the bridge girder 208, the pair of wheels 18 of the flying machine 10 are in a contacted state with the lower face of the bridge girder 208. The flying machine 10 then moves in a horizontal direction along the lower face of the bridge girder 208 accompanying rotation of the wheels 18 due to the contact with the lower face of the bridge girder 208. When the flying machine 10 arrives at a side face of the bridge pile 206, the flying machine 10 adopts a state in which the pair of wheels 18 of the flying machine 10 have contacted the side face of the bridge pile 206. The flying machine 10 then descends along the side face of the bridge pile 206 accompanying rotation of the pair of wheels 18 due to the contact with the side face of the bridge pile 206.

Figure 23:
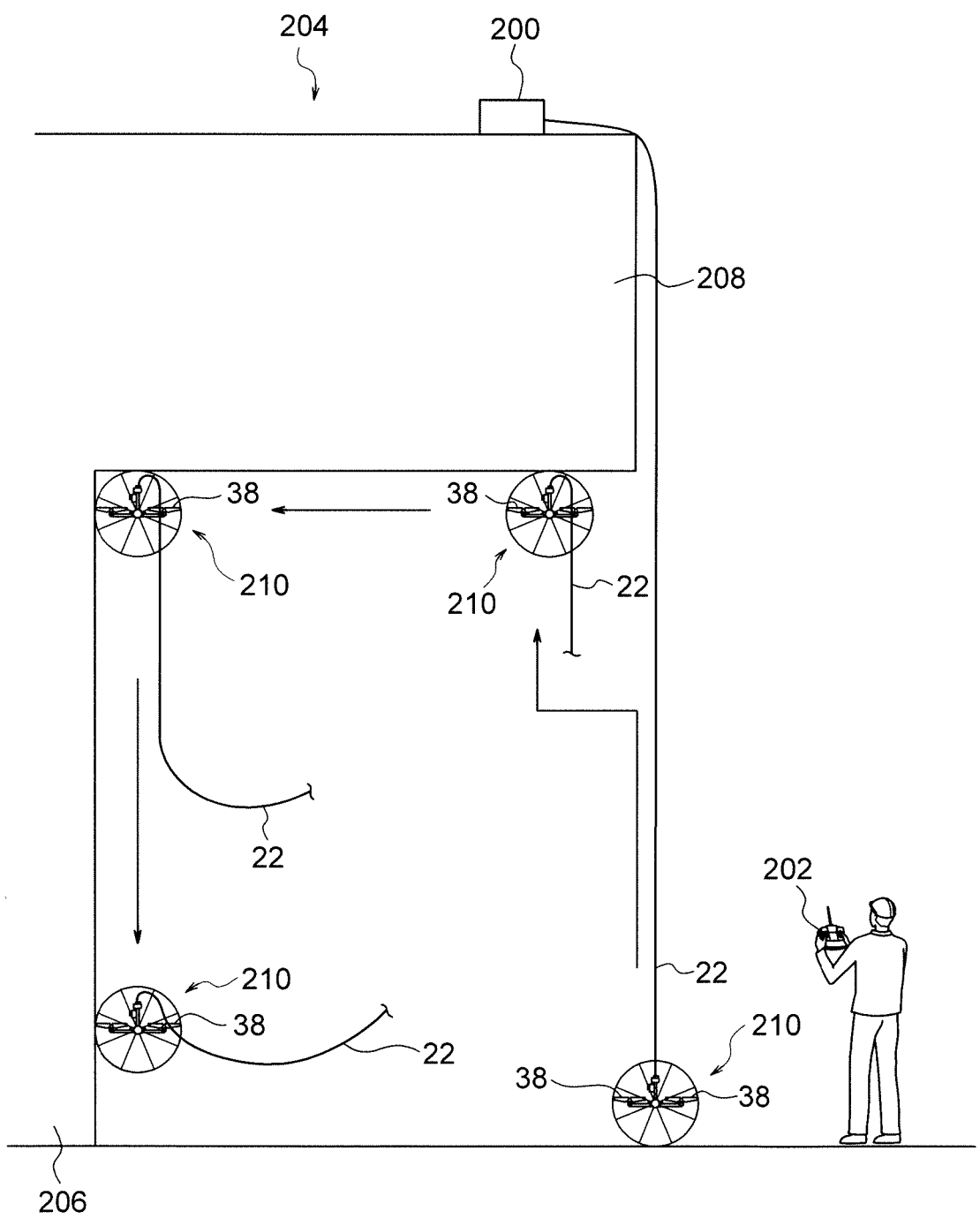
FIG. 23 is a drawing illustrating a usage method of a flying machine according to a first comparative example.

When the flying machine body 12 and the external device 200 are connected to each other using the connecting wire 22 as described above, there is a concern that the connecting wire 22 might become entangled in the rotor blades 38. FIG. 23 illustrates a comparative example that corresponds to the first example in which the external device 200 is placed on top of the bridge girder 208. The first comparative example illustrated in FIG. 23 employs a flying machine 210 in which the connecting wire 22 is fixed to the flying machine body 12 so as to be oriented upward. When the connecting wire 22 is fixed to the flying machine body 12 so as to be oriented upward in this manner, there is a concern that a slack portion of the connecting wire 22 might become entangled in the plural rotor blades 38 when the flying machine 210 ascends, for example.

In contrast thereto, the flying machine 10 of the present exemplary embodiment in FIG. 8 is provided with the frame shaped protective member 20 with the plural rotor blades 38 disposed at the inside thereof. The protective member 20 is capable of rotating in a direction orthogonal to the axial direction of the rotor blades 38. The protective member 20 is pipe shaped, and the connecting wire 22 passes through an inner portion of the protective member 20 to connect the flying machine body 12 and the external device 200 together.

The protective member 20 is thereby rotated according to the orientation of force acting on an end portion at the flying machine 10 side of the connecting wire 22, thereby enabling a state to be maintained in which the connecting wire 22 is distanced from the plural rotor blades 38. This enables entanglement of the connecting wire 22 in the rotor blades 38 to be suppressed.

Figure 9:
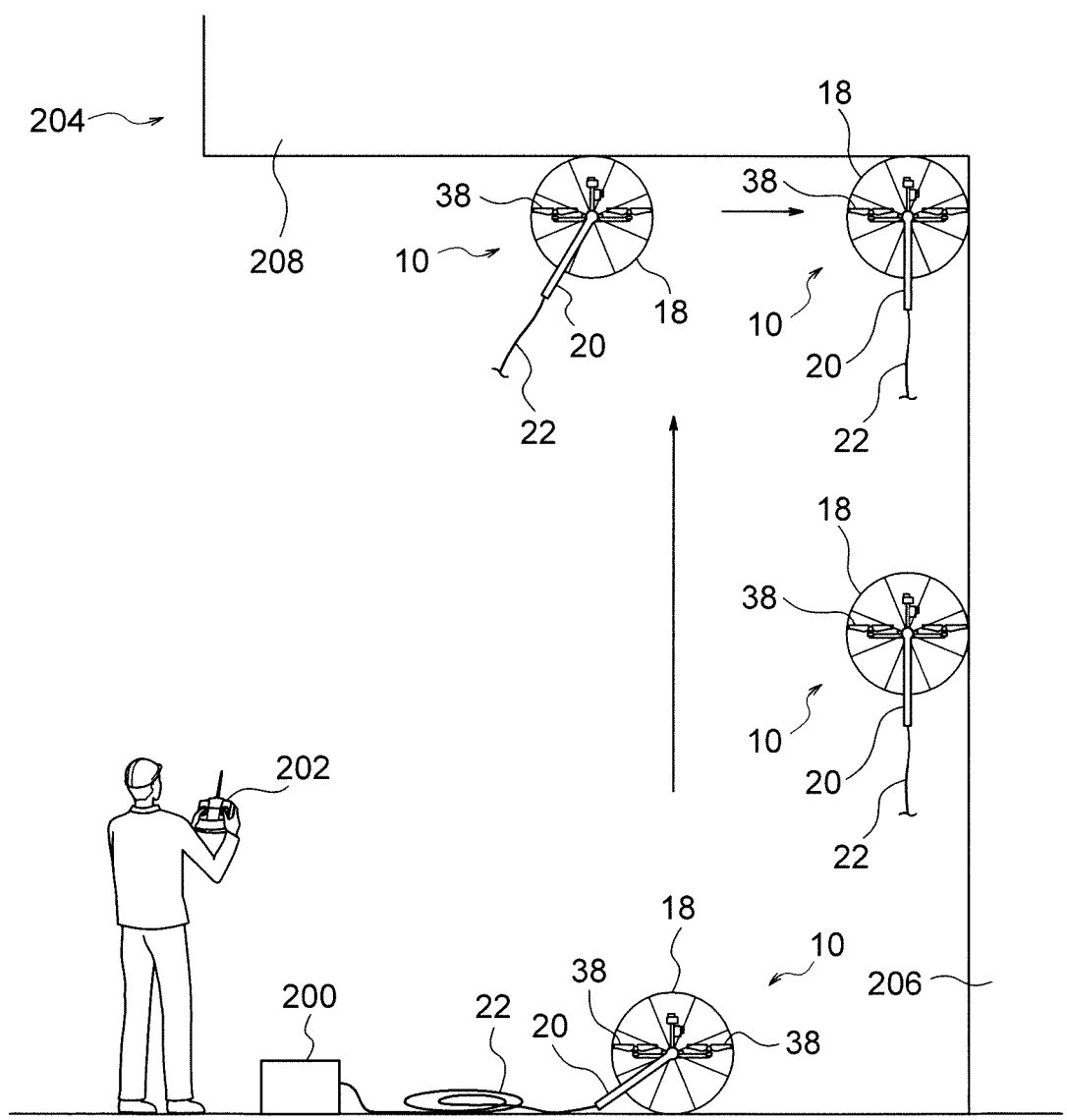
FIG. 9 is a drawing illustrating a second example of a usage method of a flying machine.

FIG. 9 illustrates a second example of a usage method of the flying machine 10. In contrast to the above-described first example, in the second example, the external device 200 is placed on the ground, and the flying machine 10 is disposed on the ground alongside the external device 200. In a state in which the external device 200 and the flying machine 10 have been disposed on the ground, the connecting wire 22 is in a state disposed running along the ground.

In this second example, when the flying machine 10 ascends and the flying machine 10 reaches the lower face of the bridge girder 208, the pair of wheels 18 of the flying machine 10 are in a contacted state with the lower face of the bridge girder 208. The flying machine 10 then moves in a horizontal direction along the lower face of the bridge girder 208 accompanying rotation of the pair of wheels 18 due to the contact with the lower face of the bridge girder 208. When the flying machine 10 arrives at the side face of the bridge pile 206, the flying machine 10 adopts a state in which the pair of wheels 18 of the flying machine 10 have contacted the side face of the bridge pile 206. The flying machine 10 then descends along the side face of the bridge pile 206 accompanying rotation of the pair of wheels 18 due to the contact with the side face of the bridge pile 206.

Figure 24:
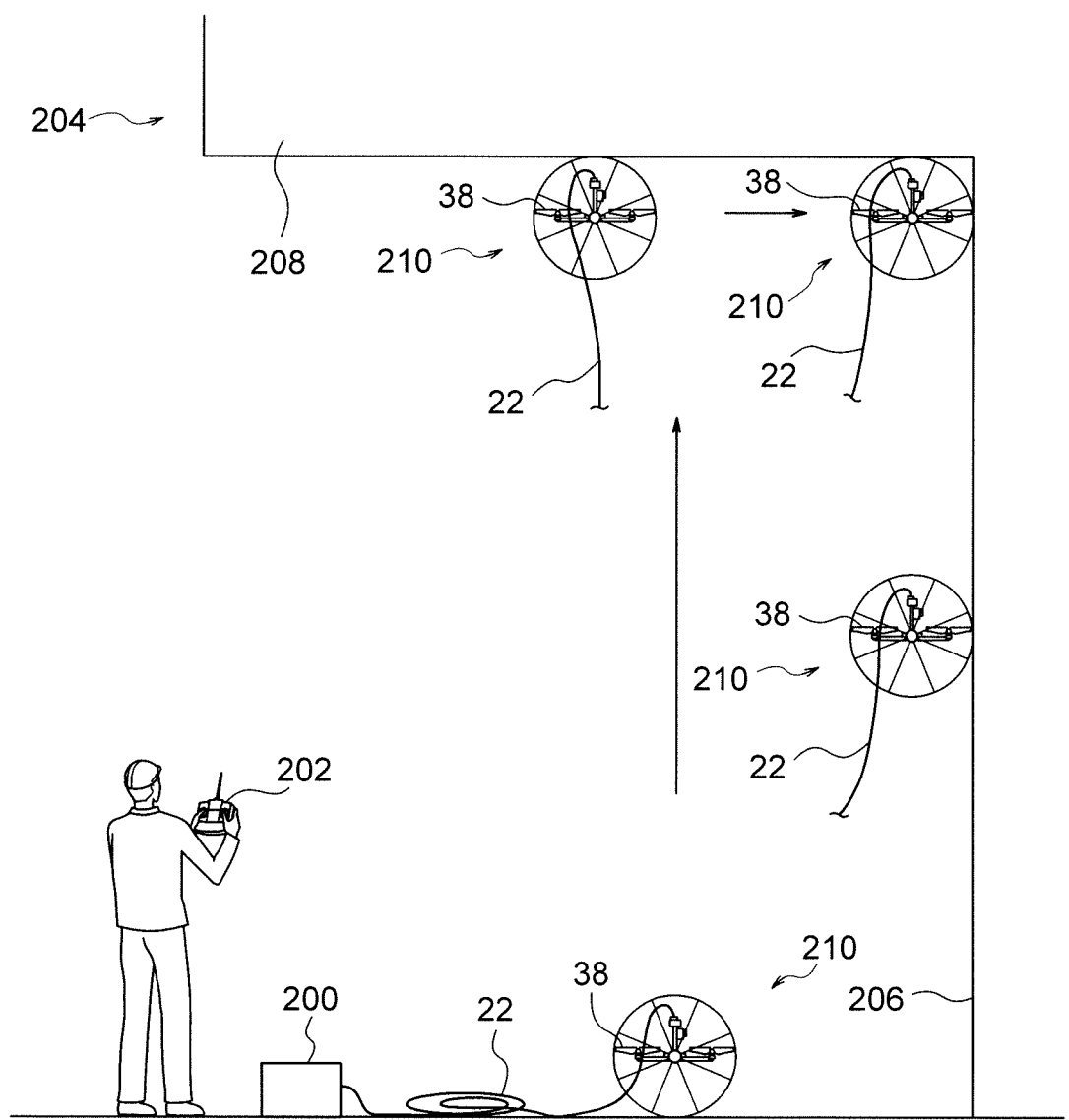
FIG. 24 is a drawing illustrating a usage method of a flying machine according to a second comparative example.

FIG. 24 illustrates a comparative example that corresponds to the second example in which the external device 200 is placed on the ground surface. The second comparative example illustrated in FIG. 24 also employs the flying machine 210 in which the connecting wire 22 is fixed to the flying machine body 12 so as to be oriented upward. When the connecting wire 22 is fixed to the flying machine body 12 so as to be oriented upward in this manner, there is a concern that a slack portion of the connecting wire 22 might become entangled in the plural rotor blades 38 when the flying machine 210 ascends, for example.

In contrast thereto, the flying machine 10 of the present exemplary embodiment in FIG. 9 employs the protective member 20 as previously described. The protective member 20 thereby rotates according to the orientation of force acting on the end portion at the flying machine 10 side of the connecting wire 22, thereby enabling a state to be maintained in which the connecting wire 22 is distanced from the plural rotor blades 38. This enables entanglement of the connecting wire 22 in the rotor blades 38 to be suppressed.

Thus, in the flying machine 10 of the present exemplary embodiment, entanglement of the connecting wire 22 in the rotor blades 38 can be suppressed, both in cases in which the external device 200 is disposed opposite to and above the flying machine 10, and in cases in which the external device 200 is placed on the ground together with the flying machine 10.

Note that in the above-described first and second examples, an example has been explained in which imaging, observing, recording, examining, inspecting, and so on of the bridge 204 are performed. However, at least one operation from out of coating, marking, or other operations may be performed using the flying machine 10. Moreover, tools, members, or the like may be conveyed by the flying machine 10 to a worker working in a high location during work on, or examination of, a bridge, for example.

In the above-described first and second examples, the flying machine 10 is applied for use on a bridge. However, the flying machine 10 may be applied for use on at least one target object from out of a construction other than a bridge, a tunnel, a roof, a ladder, a utility pole, a chimney, a large passenger aircraft, or another structural object.

Explanation follows regarding operation and advantageous effects of the present exemplary embodiment.

As described in detail above, the flying machine 10 of the present exemplary embodiment is provided with the frame shaped protective member 20 with the rotor blades 38 disposed at the inside thereof. The protective member 20 is capable of rotating in a direction orthogonal to the axial direction of the rotor blades 38. The protective member 20 is pipe shaped, and the connecting wire 22 passes through an inner portion of the protective member 20 to connect the flying machine body 12 and the external device 200 together.

The protective member 20 is thereby rotated according to the orientation of force acting on the end portion at the flying machine 10 side of the connecting wire 22, thereby enabling a state to be maintained in which the connecting wire 22 is distanced from the plural rotor blades 38. This enables entanglement of the connecting wire 22 in the rotor blades 38 to be suppressed.

As illustrated by the imaginary lines in FIG. 3, cases in which the protective member 20 rotates from a downward-oriented position to an upward-oriented position and cases in which the protective member 20 rotates from an upward-oriented position to a downward-oriented position are envisaged in the usage conditions of the flying machine 10.

As illustrated in FIG. 3 and FIG. 4, the outer peripheral portions 40 of the pair of wheels 18 jut out further to the outside than the rotation swept paths 50 of the rotor blades 38 in an axial direction view of the rotor blades 38, and the axial direction length of the pair of first pipes 52 is longer than the radius of each wheel 18. Thus, when the frame shaped protective member 20 is rotated about the width direction of the flying machine body 12, the second pipe 54 passes at the outside of the rotation swept paths 50 of the rotor blades 38.

In FIG. 3 and FIG. 4, the manner in which the second pipe 54 passes further toward the rear side than the rotation swept paths 50 of the rotor blades 38 provided at the rear side of the flying machine 10 is illustrated by imaginary lines as an example. Thus, interference between the second pipe 54 of the protective member 20 and the plural rotor blades 38 can be suppressed.

As illustrated in FIG. 1 and FIG. 2, the protective member 20 has a simple structure including the pair of first pipes 52 and the second pipe 54. Thus, entanglement of the connecting wire 22 in the rotor blades 38 can be suppressed using a simple structure, thereby enabling an increase in cost to be suppressed.

The connecting wire 22 passes through an inner portion the protective member 20 between the opening 58, positioned at the one end of either first pipe 52 from out of the pair of first pipes 52, and the opening 62 of the guide portion 60 positioned at the length direction central portion of the second pipe 54.

Positioning the opening 62 for guiding the connecting wire 22 out toward the external device side at the length direction central portion of the second pipe 54 enables the balance of the flying machine 10 to be secured. This enables a reduction in the flying performance of the flying machine 10 due to employing the protective member 20 to be suppressed.

The connecting wire 22 passes through the inner portion of the respective first pipe 52 from the one end across to the other end of the first pipe 52, thereby enabling the connecting wire 22 to be suppressed from flapping against the side of the flying machine 10 and enabling the stability of the flying machine 10 while flying to be secured.

The connecting wire 22 passes through the inner portion of the first pipe 52 disposed adjacent to the respective wheel 18, thereby also enabling entanglement of the connecting wire 22 in the wheel 18 to be suppressed.

The connecting wire 22 includes a power line, enabling power from an external device to be supplied to the flying machine body 12 through the power line. This enables the flight time of the flying machine 10 to be lengthened while also enabling plural electronic devices, such as the camera 14 and the sensor 16, to be mounted to the flying machine body 12, in contrast to cases in which a battery that supplies power to the flying machine body 12 is mounted on the flying machine body 12.

The pair of first pipes 52 are positioned at the axial direction outsides of the pair of wheels 18, thereby enabling the distance between the pair of wheels 18 to be shortened and therefore enabling the flying machine 10 to be made more compact. The second pipe 54 is positioned at the radial direction outside of the pair of wheels 18, thereby enabling interference between the pair of wheels 18 and the second pipe 54 to be suppressed and rotation of the protective member 20 to be secured.

As illustrated in FIG. 3 and FIG. 4, the outer peripheral portions 40 of the pair of wheels 18 jut out further toward the outside than the rotation swept paths 50 of the rotor blades 38 in an axial direction view of the rotor blades 38. Thus, in a state in which the pair of wheels 18 are in contact with a planar face of a target object, interference between the planar face of the target object and the rotor blades 38 can be suppressed.

As illustrated in FIG. 6, each spoke 42 has a framework structure employing plural plate members 44 with their plate thickness direction along the circumferential direction of the respective wheel 18. This enables the rigidity of the wheel 18 to be secured while securing the opening area in the axial direction of the wheel 18.

As illustrated in FIG. 4, each of the guard sections 46 that protect the rotor blades 38 is provided to part of the surrounding portion of the respective rotor blade 38, this being a part excluding the location 48 facing the respective wheel 18. The guard sections 46 are thereby more compact than in cases in which each guard section 46 is also provided to the location 48 facing the respective wheel 18, thereby enabling the flying machine 10 to be made more lightweight.

The location 48 of the surrounding portion of each rotor blade 38 that faces the respective wheel 18 is protected by the wheel 18, thereby enabling the protection performance of the rotor blade 38 to be secured.

As illustrated in FIG. 5, the pipe shaped wheel shafts 34 are respectively provided at both end portions of the flying machine body 12, and the connecting wire 22 passes through the inner portion of the respective wheel shaft 34. This enables the connecting wire 22 to be routed from one axial direction side toward the other axial direction side of the wheels 18 while suppressing interference between the connecting wire 22 and the wheels 18.

As illustrated in FIG. 1 and FIG. 4, the pair of suspension mechanisms 26 that respectively support the pair of wheels 18 are provided to the flying machine body 12. This enables impact when the flying machine 10 lands and when the flying machine 10 contacts the face of a target object to be absorbed by the pair of suspension mechanisms 26.

Figure 10:
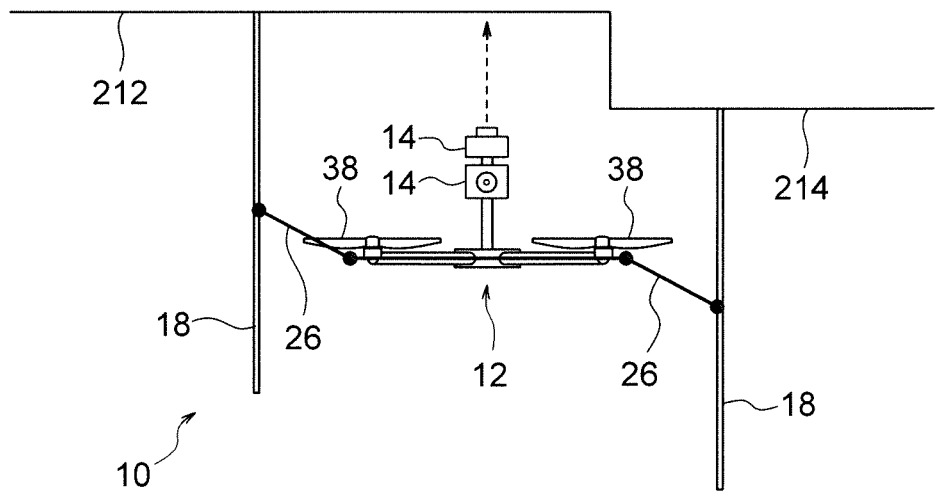
FIG. 10 is a drawing illustrating an example in which one wheel of a flying machine is riding on a step on a lower face of a target object.
Figure 11:
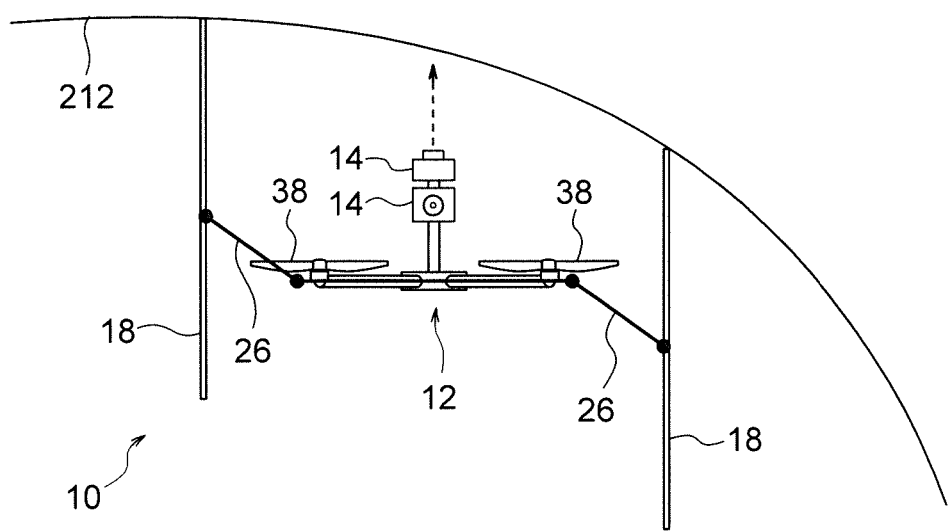
FIG. 11 is a drawing illustrating an example in which a pair of wheels of a flying machine have contacted a curved face of a target object.
Figure 12:
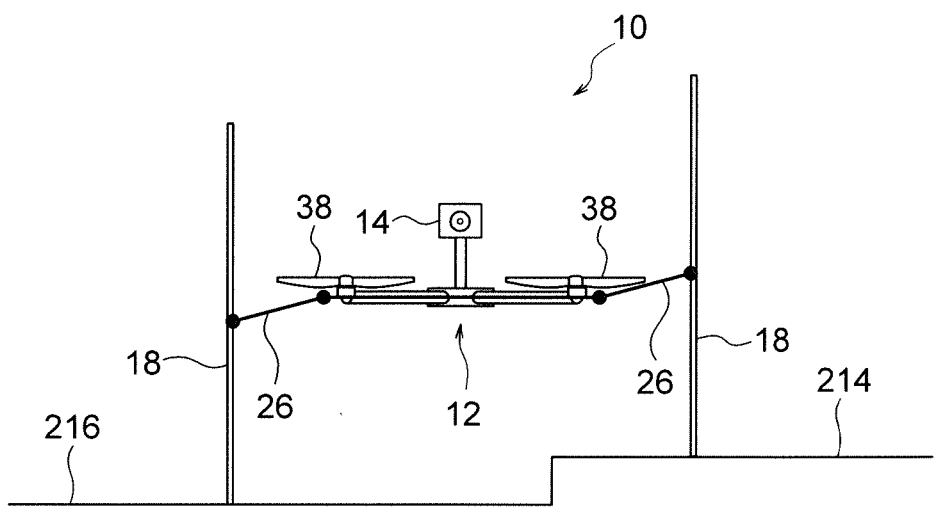
FIG. 12 is a drawing illustrating an example in which one wheel of a flying machine is riding on a step of a ground surface.

FIG. 10 to FIG. 12 are drawings for explaining operation of the pair of suspension mechanisms 26. In the example illustrated in FIG. 10, a wall face 212 of a target object has a step 214, and one wheel 18 is riding on the step 214. In the flying machine 10 of the present exemplary embodiment, one suspension mechanism 26 operates so as to enable the flying machine 10 to remain parallel to the wall face 212 of the target object.

In the example illustrated in FIG. 11, a wall face 212 of a target object is curved, and the pair of wheels 18 are in contact with this curved wall face 212. In the flying machine 10 of the present exemplary embodiment in this case also, one suspension mechanism 26 operates so as to enable tilting of the flying machine 10 to be suppressed.

Note that in the examples illustrated in FIG. 10 and FIG. 11, an additional camera 14 for imaging the wall face 212 is mounted to the flying machine body 12.

In the example illustrated in FIG. 12, a ground surface 216 has a step 214, and one wheel 18 is riding on the step 214. In the flying machine 10 of the present exemplary embodiment, one suspension mechanism 26 operates so as to enable the flying machine 10 to remain horizontal. Thus, when performing processing to ascertain that an electronic device mounted to the flying machine 10 is horizontal, for example, this ascertainment processing can be performed appropriately.

Explanation follows regarding modified examples in which items other than those described in the above exemplary embodiment can be employed.

First Modified Example

Figure 13:
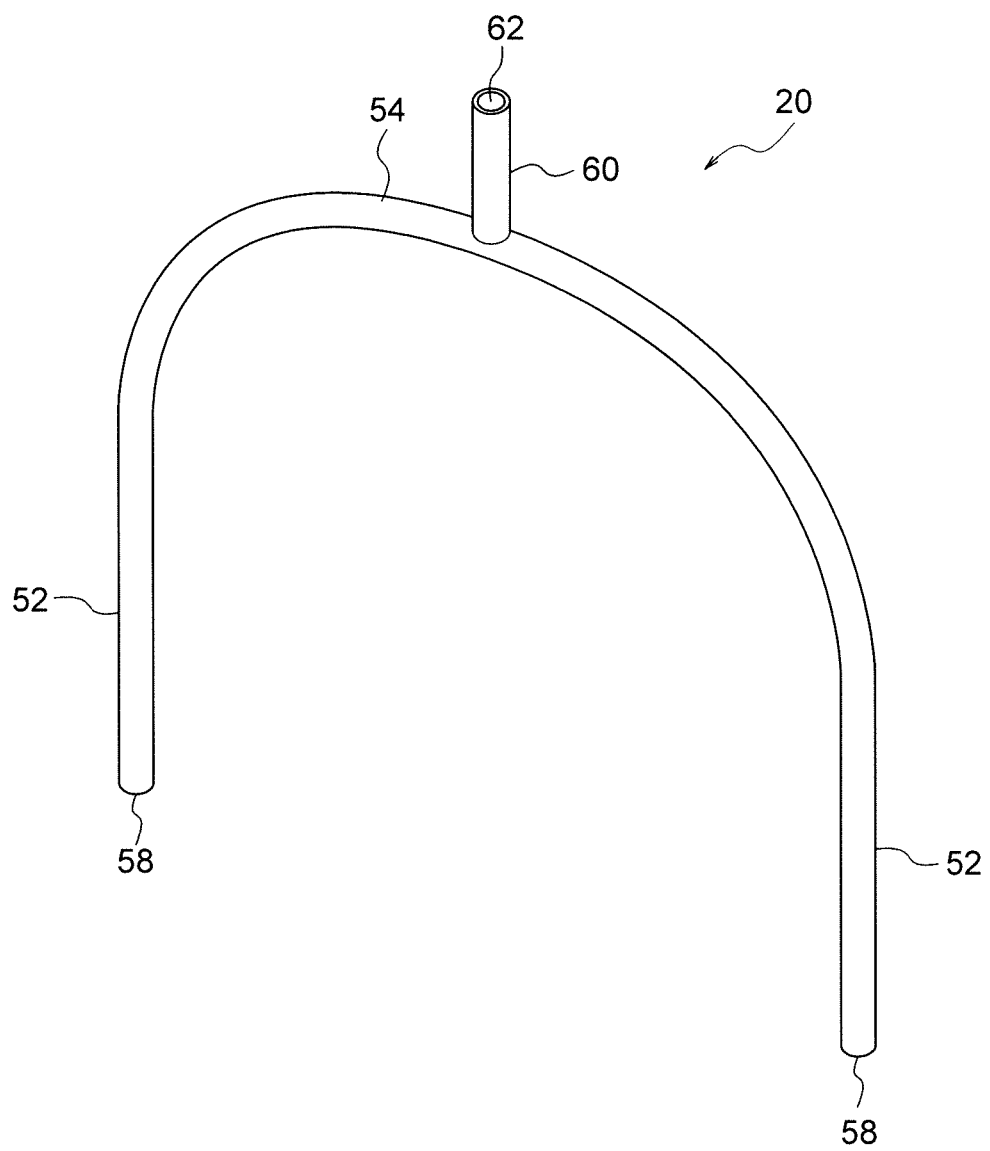
FIG. 13 is a perspective view illustrating a modified example of an arch shaped protective member.

In the above exemplary embodiment, the protective member 20 forms a goalpost shape overall by forming the second pipe 54 in a straight line shape. However, as illustrated in FIG. 13, the protective member 20 may be formed in an arch shape overall by curving the second pipe 54.

Although the protective member 20 is preferably capable of being divided into plural members in consideration of the portability and so on of the flying machine 10, the protective member 20 may be integrally formed.

Second Modified Example

Figure 14:
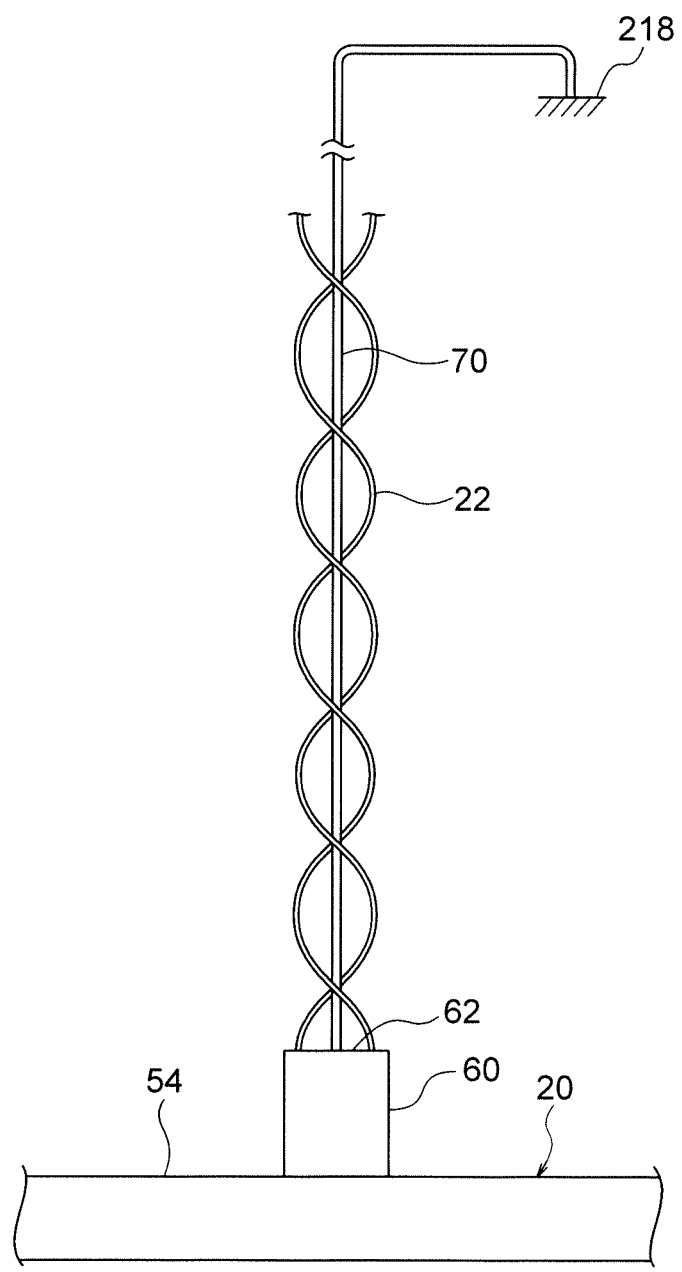
FIG. 14 is a diagram illustrating a modified example employing another wire as well as a connecting wire.

As illustrated in FIG. 14, configuration may be such that one end of a wire 70 is fixed to the protective member 20, and another end of the wire 70 is fixed to an external fixing target object 218. Including the wire 70 so as to connect the protective member 20 and the external fixing target object 218 together in this manner enables a movement range of the flying machine 10 to be limited in cases in which the flying machine 10 is employed as illustrated in FIG. 8 and FIG. 9, for example.

As illustrated in FIG. 14, the connecting wire 22 may be configured as wires twisting about the wire 70 when the wire 70 is employed. Such a configuration enables the connecting wire 22 to be routed alongside the wire 70, thereby enabling entanglement of the connecting wire 22 and the wire 70 to be suppressed.

Note that the connecting wire 22 may be reinforced such that the connecting wire 22 has an additional function of limiting the movement range of the flying machine 10.

Third Modified Example

Figure 15:
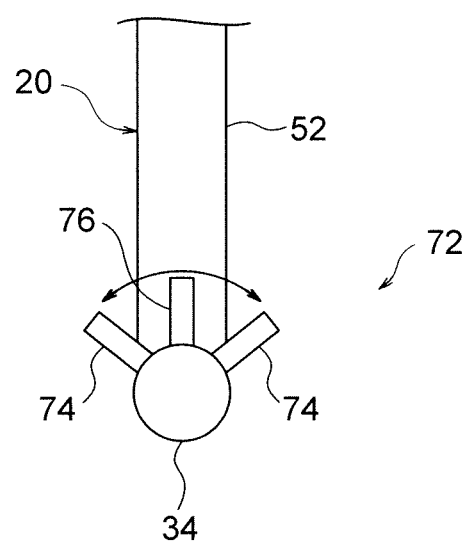
FIG. 15 is a diagram illustrating a modified example in which a restricting mechanism has been added to a wheel and an axle.

As illustrated in FIG. 15, a restricting mechanism 72 that restricts rotation of the protective member 20 to within a fixed rotation angle may be provided between the respective wheel shaft 34 and the protective member 20. As an example, the restricting mechanism 72 includes a pair of anchoring portions 74 provided to the wheel shaft 34, and an anchored portion 76 provided to the respective first pipe 52. Rotation of the protective member 20 is restricted to within the range in which the anchored portion 76 is capable of moving between the pair of anchoring portions 74.

Such a configuration enables circling of the protective member 20 to be suppressed. This enables the connecting wire 22 to be suppressed from being wound about the flying machine body 12 in cases in which the flying machine 10 is employed as illustrated in FIG. 8 and FIG. 9, for example.

Fourth Modified Example

Figure 16:
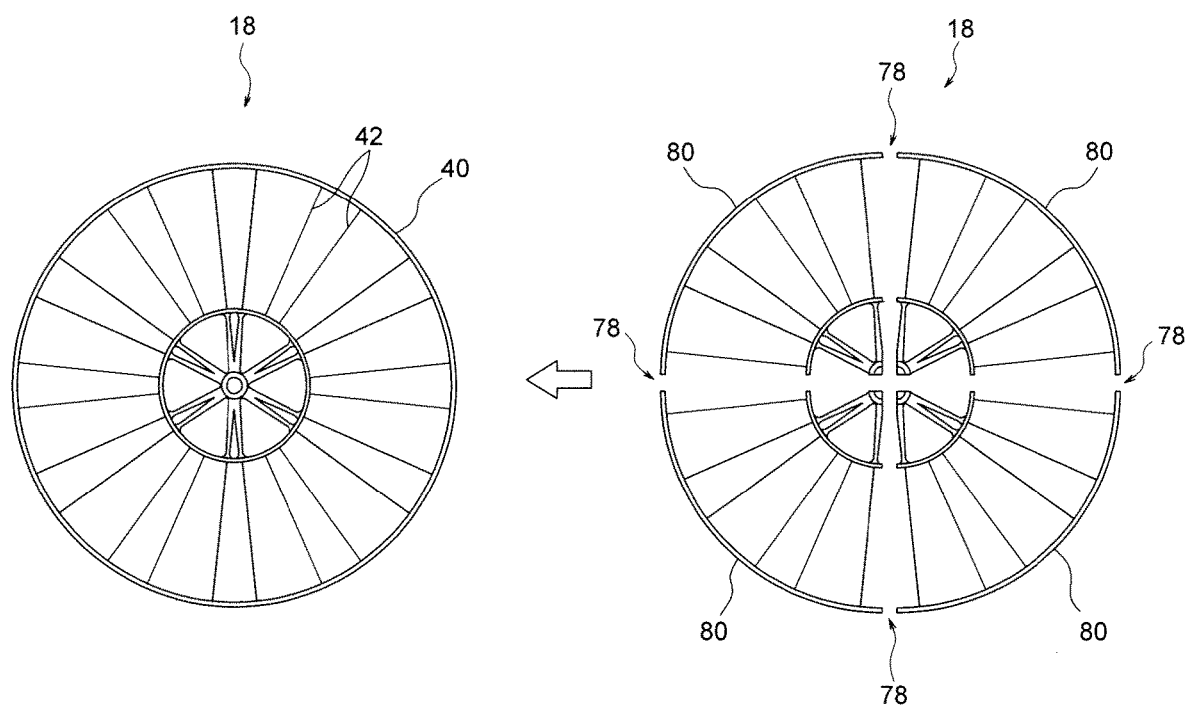
FIG. 16 is a diagram for explaining a modified example in which a wheel has been divided into plural fan shaped members.

As illustrated in FIG. 16, each wheel 18 may be divided into plural fan shaped members 80 by plural dividing sections 78 extending along the radial direction of the wheel 18. The wheel 18 may be assembled in a circular shape by combining the plural fan shaped members 80.

Such a configuration enables the wheel 18 to be divided into the plural fan shaped members 80. Dividing the wheel 18 into the plural fan shaped members 80 in this manner enables the portability of the flying machine 10 to a site to be increased when using the flying machine 10 as illustrated in FIG. 8 and FIG. 9, for example.

Fifth Modified Example

Figure 17:
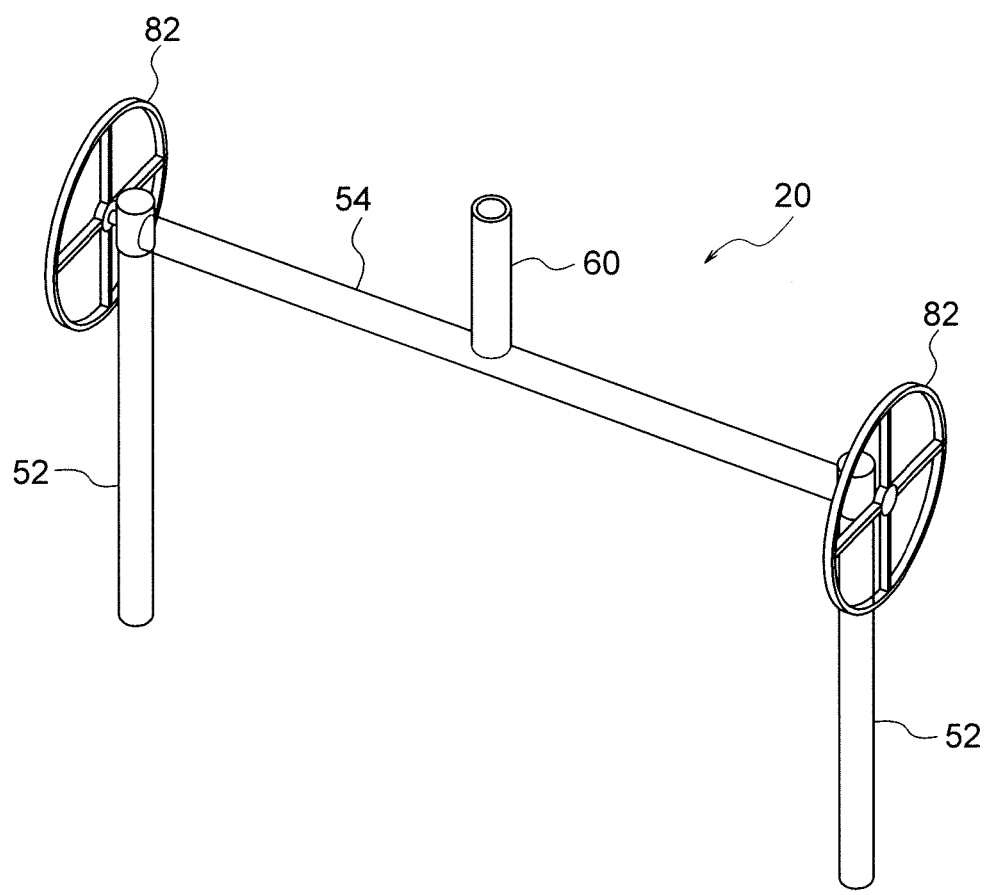
FIG. 17 is a perspective view illustrating a modified example in which a pair of auxiliary wheels have been added to a protective member.

As illustrated in FIG. 17, a pair of auxiliary wheels 82 may be respectively rotatably fixed to both end portions of the second pipe 54. The pair of auxiliary wheels 82 are capable of rotating about the axial direction of the second pipe 54.

Figure 18:
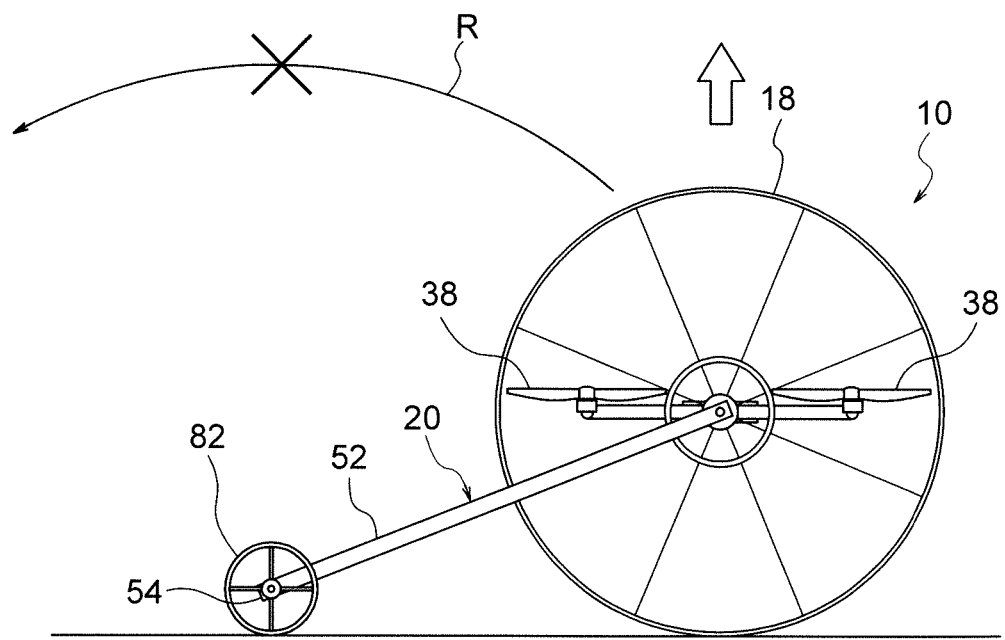
FIG. 18 is a diagram for explaining functionality of an auxiliary wheel.

Such a configuration enables the flying machine 10 to travel along the ground using the pair of auxiliary wheels 82 and the pair of wheels 18, as illustrated in FIG. 18, for example.

Supposing a case in which the pair of auxiliary wheels 82 were not employed, the second pipe 54 might become stuck on an uneven ground surface when the flying machine 10 is made to ascend diagonally toward the upper front. As illustrated by the arrow R in FIG. 18, there would be a possibility that the flying machine 10 might somersault forward with the second pipe 54 as a pivot point if the second pipe 54 became stuck on an uneven ground surface.

However, as illustrated in FIG. 18, when the pair of auxiliary wheels 82 are employed, rotation of the pair of auxiliary wheels 82 enables the second pipe 54 to be suppressed from becoming stuck on the ground surface when the flying machine 10 is made to ascend diagonally toward the upper front. This enables the flying machine 10 to be made to ascend diagonally toward the upper front in an appropriate manner.

Sixth Modified Example

Figure 19:
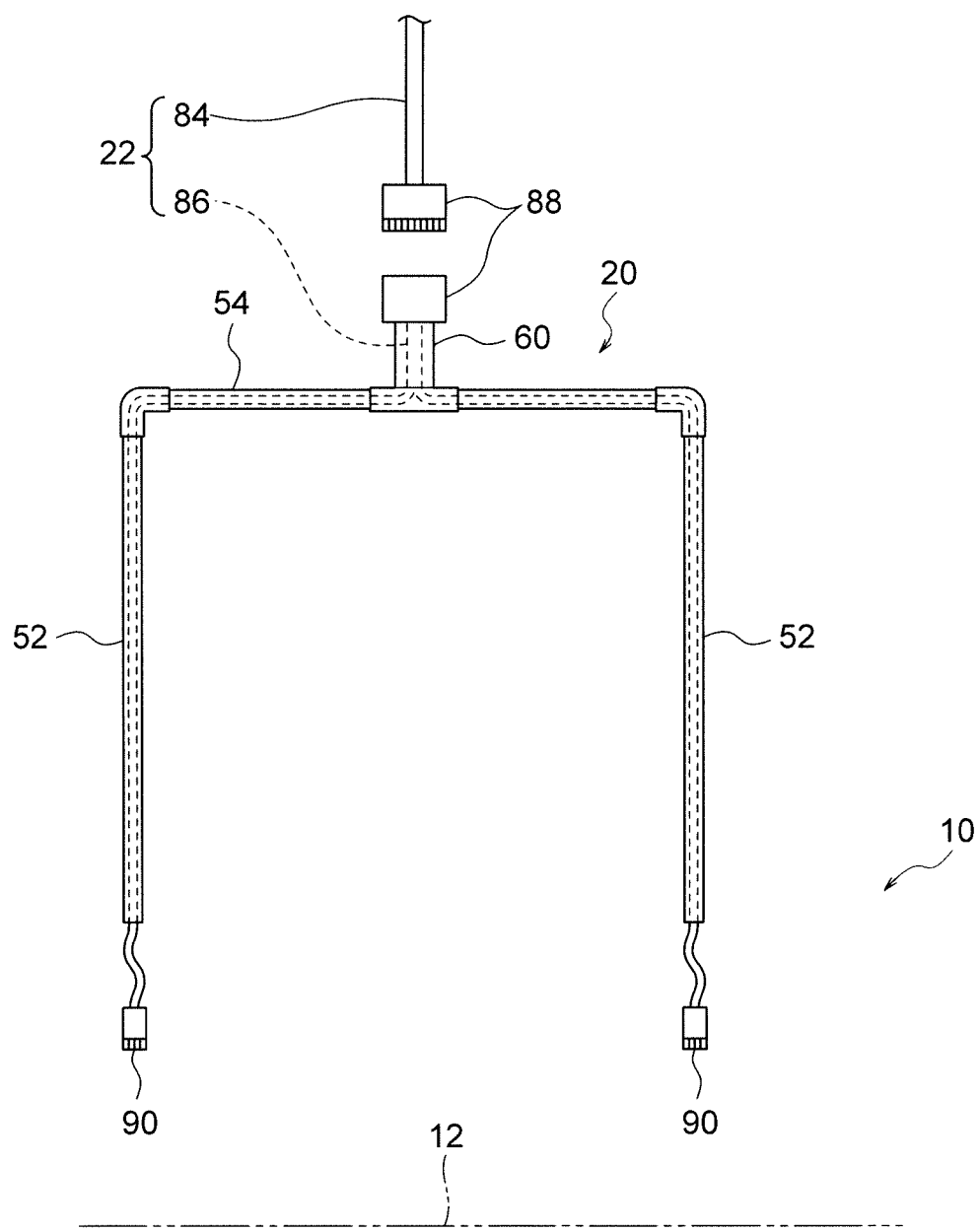
FIG. 19 is a face-on view illustrating a modified example in which a protective member is attachable to and detachable from a flying machine body.

As illustrated in FIG. 19, the protective member 20 may be configured so as to be attachable to and detachable from the flying machine body 12. In such a configuration, a state in which the protective member 20 is detached from the flying machine body 12 enables the portability of the flying machine 10 to a site to be increased when the flying machine 10 is employed as illustrated in FIG. 8 and FIG. 9, for example.

As illustrated in FIG. 19, in cases in which the protective member 20 is attachable and detachable, the connecting wire 22 may be divided into a wire body 84 and an embedded wire 86 that is embedded into the protective member 20. The wire body 84 and the embedded wire 86 may be connected together by a connector 88, and the embedded wire 86 and connecting targets on the flying machine body 12 may be connected together by connectors 90. Note that the connectors 90 are each preferably formed with a size that is capable of passing through the inner portions of the wheel shafts 34 illustrated in FIG. 1, etc.

Seventh Modified Example

Figure 20:
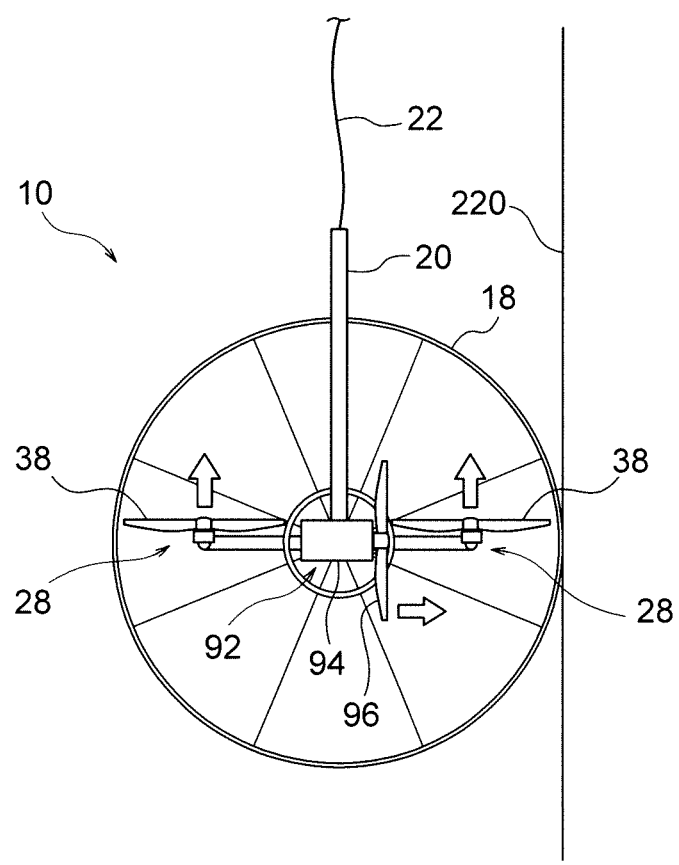
FIG. 20 is a side view illustrating a modified example in which auxiliary rotator blades have been added to a flying machine.

As illustrated in FIG. 20, auxiliary propulsion sections 92 may be respectively provided to both width direction sides of the flying machine body 12. Each auxiliary propulsion section 92 includes a motor 94 and an auxiliary rotor blade 96. The auxiliary rotor blade 96 is fixed to an output shaft of the motor 94, and the auxiliary rotor blade 96 rotates about a direction orthogonal to the axial direction of the rotor blade 38, namely, about the front-rear direction of the flying machine body 12 in the present modified example.

Such a configuration enables propulsion force of the flying machine 10 to be divided into propulsion force in a vertical direction by the propulsion sections 28 including the rotor blades 38, and propulsion force in a horizontal direction by the auxiliary propulsion sections 92 including the auxiliary rotor blades 96. Thus, it is sufficient that the propulsion sections 28 including the rotor blades 38 realize propulsion in the vertical direction, enabling the flying machine 10 to be made to ascend stably.

Propulsion force in the horizontal direction from the auxiliary propulsion sections 92 enables the wheels 18 to be pressed against a wall face 220. Moreover, controlling the output of the pair of auxiliary propulsion sections 92 enables the turning performance of the flying machine 10 to be improved while securing propulsion force of the flying machine 10 in the vertical direction.

Eighth Modified Example

Figure 21:
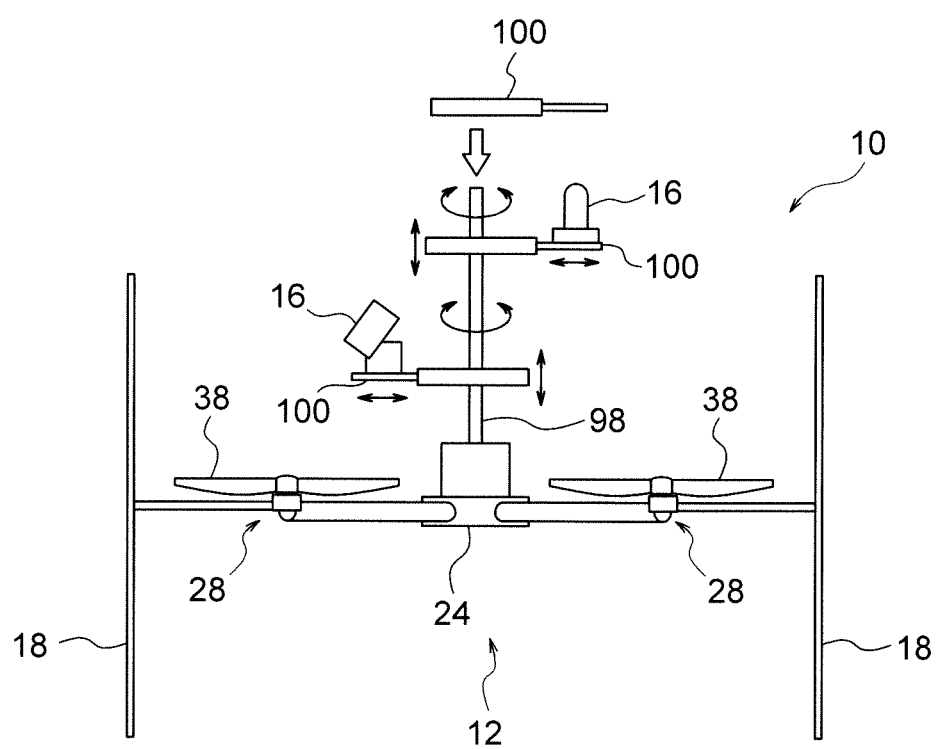
FIG. 21 is a face-on view illustrating a modified example in which plural sensors are capable of being mounted to a flying machine.

As illustrated in FIG. 21, configuration may be such that a desired number of sensors 16 are mounted at desired positions on the flying machine body 12. Namely, in the present modified example, a support rod 98 is provided to the body section 24, and a desired number of mounts 100 mounted with the respective sensors 16 can be attached to the support rod 98.

The mounts 100 are capable of rotating with respect to the support rod 98 and are also capable of moving up, down, left, and right. This enables the positions of the sensors 16 in a three-dimensional direction and the position of the overall center of mass of the plural mounted sensors 16 to be adjusted, even when the number of sensors 16 mounts is increased. Such a configuration enables the flying stability of the flying machine 10 to be secured, even in cases in which plural sensors 16 are mounted thereto.

Ninth Modified Example

Figure 22:
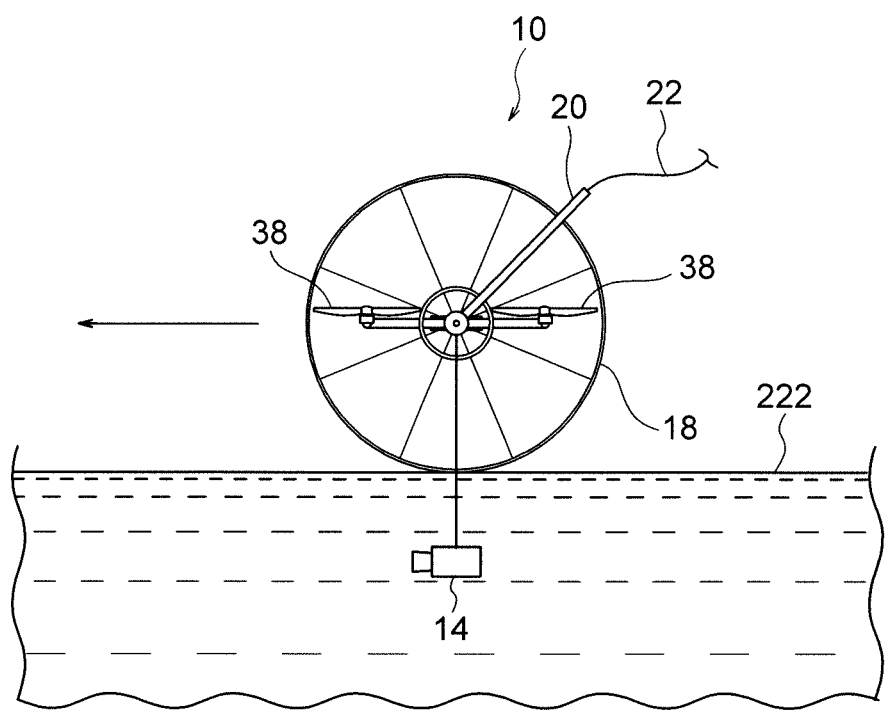
FIG. 22 is a drawing illustrating a case in which a flying machine is made to move along a water surface as a modified example of a usage method of the flying machine.

As illustrated in FIG. 22, the flying machine 10 may be employed floating on a water surface 222. In the present modified example, a foamed material such as styrene foam or foamed resin is preferably employed for the pair of wheels 18 such that the flying machine 10 floats on the water surface 222. The camera 14 hangs down at the lower side of the flying machine body 12.

In the present modified example, the rotor blades 38 rotate in a state in which the pair of wheels 18 are in contact with the water surface 222, and the flying machine 10 moves along the water surface 222 accompanying rotation of the pair of wheels 18 due to the contact with the water surface 222. Images are captured by the camera 14 while the flying machine 10 moves along the water surface 222.

Note that, although images are captured by the camera 14 in the present modified example, at least one operation other than image capture from out of observing, recording, examining, inspecting, transporting, painting, marking, or another operation may be performed by the flying machine 10 moving along the water surface 222. The flying machine 10 may also perform an operation while combining both moving along a water surface and flying in the air.

Other Modified Examples

In the above exemplary embodiment, the connecting wire 22 includes a power line and a signal line; however, the connecting wire 22 may be configured including only one from out of a power line or a signal line. The connecting wire 22 may include a line other than a power line and a signal line.

In the above exemplary embodiment, the protective member 20 is capable of being divided into plural members, namely, the pair of first pipes 52, the second pipe 54, and the pair of joints 56; however, the protective member 20 may be configured so as to be foldable.

In the above exemplary embodiment, the opening 62 for guiding the one end of the connecting wire 22 toward the external device side is positioned at the length direction central portion of the second pipe 54. However, for example, the opening 62 may be provided at any position of the second pipe 54, as long as the balance of the flying machine 10 can be secured.

The openings 58 for guiding the other end of the connecting wire 22 toward the flying machine body 12 side are positioned at the one ends of the respective first pipes 52; however, the openings 58 may be provided at any position of the first pipes 52.

In the above exemplary embodiment, the pair of first pipes 52 are positioned at the axial direction outsides of the pair of wheels 18; however, for example, each first pipe 52 may be disposed between the respective suspension mechanism 26 and the respective wheel 18.

In cases in which each first pipe 52 is disposed between the respective suspension mechanism 26 and the respective wheel 18, rotation of the protective member 20 may be restricted to within a fixed rotation angle, such that the protective member 20 does not enter the rotation swept paths 50 of the rotor blades 38.

In cases in which rotation of the protective member 20 is restricted to within a fixed rotation angle such that the protective member 20 does not enter the rotation swept paths 50 of the rotor blades 38, the length of the pair of first pipes 52 may be configured shorter than the radius of the wheels 18.

In the above exemplary embodiment, in cases in which the pair of wheel shafts 34 are flexible, for example, the wheel shafts 34 may each function as a suspension mechanism.

In the above exemplary embodiment, each guard section 46 is preferably provided to part of the surrounding portion of the rotor blade 38 excluding the location 48 facing the respective wheel 18; however, the guard section 46 may also be provided to the location 48 facing the respective wheel 18.

In the above exemplary embodiment, the protective member 20 is fixed to both width direction end portions of the flying machine body 12 so as to be capable of rotating about the width direction of the flying machine body 12. However, the protective member 20 may be fixed to both height direction end portions of the flying machine body 12 so as to be capable of rotating about the height direction of the flying machine body 12, or may be fixed to both front-rear direction end portions of the flying machine body 12 so as to be capable of rotating about the front-rear direction of the flying machine body 12.

An exemplary embodiment of technology disclosed in the present application has been explained above; however, the technology disclosed in the present application is not limited to that described above, and obviously various other modifications may be implemented within a range not departing from the spirit of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A flying machine comprising:
a flying machine body that includes a rotor blade;
a protective member that includes a pair of first pipes that have length direction one ends respectively rotatably fixed to both end portions of the flying machine body, that includes a second pipe that couples length direction other ends of the pair of first pipes together, and that is pipe shaped; and
a connecting wire that passes through an inner portion of the protective member to connect the flying machine body and an external device together,
wherein a pair of wheels are rotatably fixed to both end portions of the flying machine body, and the pair of wheels are positioned inside the protective member.

2. The flying machine of claim 1, wherein on rotation the protective member passes at the outside of a rotation swept path of the rotor blade.

3. The flying machine of claim 1, wherein:
the connecting wire passes through the inner portion of the protective member between an opening positioned at the length direction one end of a first pipe from out of the pair of first pipes, and an opening positioned at a length direction central portion of the second pipe.

4. The flying machine of claim 1, wherein:
the protective member is fixed to both width direction end portions of the flying machine body so as to be capable of rotating about a width direction of the flying machine body;
the pair of wheels are rotatably fixed to both width direction end portions of the flying machine body;
the pair of first pipes are positioned at an axial direction outside of the pair of wheels; and
the second pipe is positioned at a radial direction outside of the pair of wheels.

5. The flying machine of claim 4, wherein an outer peripheral portion of the pair of wheels juts out further toward the outside than a rotation swept path of the rotor blade in an axial direction view of the rotor blade.

6. The flying machine of claim 4, further comprising a pair of suspension mechanisms that are provided to the flying machine body and that respectively support the pair of wheels.

7. The flying machine of claim 4, wherein:
each wheel includes
- a circular ring shaped outer peripheral portion, and
- a plurality of spokes that extend in a radiating shape and that support the outer peripheral portion; and each spoke has a framework structure using a plurality of plate members with a plate thickness direction along a circumferential direction of the wheel.

8. The flying machine of claim 4, further comprising a guard section that is provided to a part of a surrounding portion of the rotor blade excluding a location that faces one of the wheels.

9. The flying machine of claim 4, wherein:
- a pipe shaped axle is provided at both width direction end portions of the flying machine body to rotatably support each of the pair of wheels; and
- the connecting wire passes through an inner portion of the axle.

10. The flying machine of claim 1, wherein the connecting wire includes at least one from out of a power line or a signal line.

11. The flying machine of claim 1, wherein the protective member is capable of being divided into a plurality of members.

12. The flying machine of claim 1, wherein the flying machine body includes at least one from out of a camera or a sensor.

13. The flying machine of claim 1, further comprising a wire that connects the protective member and an external fixing target together.

14. The flying machine of claim 1, further comprising a restricting mechanism that restricts rotation of the protective member to within a fixed rotation angle.

15. The flying machine of claim 1, wherein:
- a pair of wheels are respectively rotatably fixed to both width direction end portions of the flying machine body; and
- each wheel is divided into a plurality of fan shaped members by a plurality of dividing sections extending along a radial direction of the wheel.

16. The flying machine of claim 1, wherein:
- a pair of wheels are respectively rotatably fixed to both width direction end portions of the flying machine body;
- the protective member includes a pair of first pipes that have one ends respectively rotatably fixed to both width direction end portions of the flying machine body, and a second pipe that couples other ends of the pair of first pipes together; and
- a pair of auxiliary wheels are respectively rotatably fixed to both end portions of the second pipe.

17. The flying machine of claim 1, wherein the protective member is attachable to and detachable from the flying machine body.

18. The flying machine of claim 1, further comprising an auxiliary rotor blade that rotates about a direction orthogonal to an axial direction of the rotor blade.

19. A flying machine usage method comprising:
using the flying machine of claim 1 to perform at least one operation from out of imaging, observing, recording, examining, inspecting, transporting, painting, marking, or another operation, while moving the flying machine along at least one target object from out of a bridge, a building, a tunnel, a roof, a ladder, a utility pole, a chimney, a large passenger aircraft, another structural object, a ground surface, or a water surface.

* * * * *